United States Patent [19]

Motoyama

[11] Patent Number: 5,765,006
[45] Date of Patent: *Jun. 9, 1998

[54] METHOD AND SYSTEM TO PROCESS EXTERNAL ENTITIES IN A DOCUMENT PROCESSING LANGUAGE

[75] Inventor: Tetsuro Motoyama, Cupertino, Calif.

[73] Assignees: Ricoh Company, Ltd., Tokyo, Japan; Ricoh Corporation, San Jose, Calif.

[ * ] Notice: The term of this patent shall not extend beyond the expiration date of Pat. No. 5,499,329.

[21] Appl. No.: 377,548

[22] Filed: Jan. 24, 1995

Related U.S. Application Data

[63] Continuation-in-part of Ser. No. 158,674, Nov. 29, 1993, Pat. No. 5,448,691, and a continuation-in-part of Ser. No. 146,724, Nov. 2, 1993, Pat. No. 5,422,992, and a continuation-in-part of Ser. No. 148,134, Nov. 2, 1993, Pat. No. 5,483,629, and a continuation-in-part of Ser. No. 119,930, Sep. 10, 1993, Pat. No. 5,446,837, which is a continuation-in-part of Ser. No. 87,571, Jul. 2, 1993, Pat. No. 5,499,329, which is a continuation-in-part of Ser. No. 931,808, Aug. 11, 1992, Pat. No. 5,416,896, which is a continuation-in-part of Ser. No. 876,601, Apr. 30, 1992, Pat. No. 5,319,748, which is a continuation-in-part of Ser. No. 876,251, Apr. 30, 1992, Pat. No. 5,325,484.

[51] Int. Cl.$^6$ .................................................. G06F 9/44
[52] U.S. Cl. .................................................. 395/776
[58] Field of Search .................................. 395/144–149, 395/774–778

[56] References Cited

U.S. PATENT DOCUMENTS

| | | | |
|---|---|---|---|
| 4,905,138 | 2/1990 | Bourne | 395/707 |
| 5,075,847 | 12/1991 | Fromme | 395/705 |
| 5,101,493 | 3/1992 | Travis et al. | 395/601 |
| 5,119,465 | 6/1992 | Jack et al. | 395/500 |
| 5,386,520 | 1/1995 | Gillet | 395/410 |

OTHER PUBLICATIONS

Straley, Straley's Programming with Clipper 5.0, pp. 87–95, 1991.
Bauer et al., Compiler Construction, PP. 197–220, 1976.
Franks, Adding an Extension Language to Your Software, Dr. Dobb's Journal, pp. 34–43, Sep. 1991.
Straley, Straley's Progamming with Clipper 5.0, pp.721–723 1991.

*Primary Examiner*—Anton W. Fetting
*Attorney, Agent, or Firm*—Oblon, Spivak, McClelland, Maier & Neustadt, P.C.

[57] ABSTRACT

A method and apparatus for processing external inclusions in a document processing language. The external inclusions can have varying formats and each of these varying formats are handled efficiently. A picture/pageset stack is used to keep track of the hierarchical levels of the document and refers to a data structure used for keeping track of the information pertaining to the external inclusion. It is possible for the external inclusion to include other external inclusions and an input stack and an input list data structure is used for keeping track of the various input files which may be open. It is possible for the external inclusion to have a plurality of nested tags having the same name and a tag mark stack is used in order to keep track of these elements within the external inclusion. In order to keep track of an external entity defined within a <!DOCTYPE element occurring at the beginning of an external inclusion, a location entity linked list data structure is used. Different processes including an external input filter process, a process for handling the <!DOCTYPE element, an ending process, and a process for handling the end of the structure ID element are each used in order to efficiently process external inclusions.

20 Claims, 24 Drawing Sheets

```
1  <!DOCTYPE SPDL PUBLIC "ISO/IEC 10180//DTD Standard Page Description Language//EN">
2  <SPDL>
3    <COMMENT>
4      extern1
5    </COMMENT>
6    <PICTURE CONTREP = "ISO/IEC 10180//content::SPDL-cleartext">
7      <PICTBDY>
8        <PROLOGUE>
9          <EXTNDCL STRCLID = "PICTURE">
10           <STRCTID>
11             MYExtern1
12           </STRCTID>
13           <LOCLCID>
14             /externals
15           </LOCLCID>
16         </EXTNDCL>
17       </PROLOGUE>
18       <STRCTID>
19         MYExtern1
20       </STRCTID>
21     </PICTBDY>
22   </PICTURE>
23 </SPDL>
```

*FIG. 1A*

```
1  <!DOCTYPE SPDL PUBLIC "ISO/IEC 10180//DTD Standard Page Description Language//EN">
2  <SPDL>
3    <COMMENT>
4       extern1
5    </COMMENT>
6    <PICTURE CONTREP = "ISO/IEC 10180//content::SPDL-cleartext">
7      <PICTBDY>
8        <PROLOGUE>
9          <EXTNDCL STRCLID = "PICTURE">
10           <STRCTID>
11              MYExtern1
12           </STRCTID>
13           <PUBOBID NOTATION = "PUBID">
14              UNREGISTERED::motoyama//MyExternal::Public1
15           </PUBOBID>
16         </EXTNDCL>
17       </PROLOGUE>
18       <STRCTID>
19          MYExtern1
20       </STRCTID>
21     </PICTBDY>
22   </PICTURE>
23 </SPDL>
```

*FIG. 1B*

```
1  <!DOCTYPE SPDL PUBLIC "ISO/IEO 10180//DTD Standard Page Description Language//EN">
2  <SPDL>
3    <COMMENT>
4      extern2
5    </COMMENT>
6    <PICTURE CONTREP = "ISO/IEC 10180//Content::SPDL-ClearText">
7      <PICTBDY>
8        <PROLOGUE>
9          <EXTNDCL STRCLID = "PICTURE">
10           <STRCTID>
11             MyPicture
12           </STRCTID>
13           <PUBOBID NOTATION = "OBJID">
14             1.0.10180.0.12.1
15           </PUBOBID>
16         </EXTNDCL>
17       </PROLOGUE>
18       <STRCTID>
19         MyPicture
20       </STRCTID>
21     </PICTBDY>
22   </PICTURE>
23 </SPDL>
```

*FIG. 1C*

```
1 <!DOCTYPE SPDL PUBLIC "ISO/IEO 10180//DTD Standard Page Description Language//EN">
2 <SPDL>
3   <COMMENT>
4     extern2
5   </COMMENT>
6   <PICTURE CONTREP = "ISO/IEC 10180//Content::SPDL-ClearText">
7     <PICTBDY>
8       <PROLOGUE>
9         <EXTNDCL STRCLID = "CFNTSPC">
10          <STRCTID>
11            MyComposite
12          </STRCTID>
13          <LOCLCID>
14            /externals
15          </LOCLCID>
16        </EXTNDCL>
17      </PROLOGUE>
18    </PICTBDY>
19  </PICTURE>
20 </SPDL>
```

*FIG. 2*

```
1  <!DOCTYPE SPDL PUBLIC "ISO/IEC 10180//DTD Standard Page Description Language//EN">
2  <SPDL>
3    <COMMENT>
4      extern4
5    </COMMENT>
6    <PICTURE CONTREP = "ISO/IEC 10180//Content::SPDL-ClearText">
7      <PICTBDY>
8        <PROLOGUE>
9          <EXTNDCL STRCLID = "CLRSSPC">
10           <STRCTID>
11             Mycolor
12           </STRCTID>
13           <SGMLEXT>
14             SYSTEM "/external/identifier1"
15           </SGMLEXT>
16         </EXTNDCL>
17       </PROLOGUE>
18     </PICTBDY>
19   </PICTURE>
20 </SPDL>
```

*FIG. 3A*

```
1  <!DOCTYPE SPDL PUBLIC "ISO/IEC 10180//DTD Standard Page Description Language//EN">
2     [<!ENTITY EXTDECL SYSTEM "~/externals/contdecl">]>
3  <SPDL>
4    <COMMENT>
5        Copyright 1994 by Ricoh Corporation
6        ALL Rights Reserved
7        Confidential and Properietary
8        File Name:  extern5
9        Created :   13 April 1994
10       Author :    Tetsuro Motoyama
11
12   </COMMENT>
13   <PICTURE CONTREP = "ISO/IEC 10180//Content::SPDL-ClearText">
14     <PICTBDY>
15       <PROLOGUE>
16         <EXTNDCL STRCLID = "CNTXDCL">
17           <STRCTID>
18             ContextDecl
19           </STRCTID>
20           <SGMLENT ENTNAME = "EXTDECL">
21         </EXTNDCL>
22       </PROLOGUE>
23       <TKNSEQN>
24       </TKNSEQN>
25     </PICTBDY>
26   </PICTURE>
27 </SPDL>
```

*FIG. 3B*

```
1  <!DOCTYPE SPDL PUBLIC "ISO/IEC 10180//DTD Standard Page Description Language//EN">
2  [<!ENTITY ExtTkn SYSTEM "mydirectory/ext_tkn">]>
3  <SPDL>
4  <PICTURE CONTREP = "ISO/IEC 10180//Content::SPDL-ClearText">
5    <PICTBDY>
6      <PROLOGUE>
7        <EXTNDCL STRCLID ="TKNSEQN">
8          <STRCTID>
9            MyTokenSequence
10         </STRCTID>
11         <SGMLENT ENTNAME = "ExtTkn">
12       </EXTNDCL>
13     </PROLOGUE>
14     <STRCTID>
15       MyTokenSequence
16     </STRCTID>
17   </PICTBDY>
18  </PICTURE>
19 </SPDL>
```

FIG. 4A

```
1 <!DOCTYPE SPDL PUBLIC "ISO/IEC 10180//DTD Standard Page Description Language//EN">
2 <SPDL>
3   <TKNSEQN>
4     10 10 moveto
5     40 40 lineto
6     stroke
7   </TKNSEQN>
8 </SPDL>
```

*FIG. 4B*

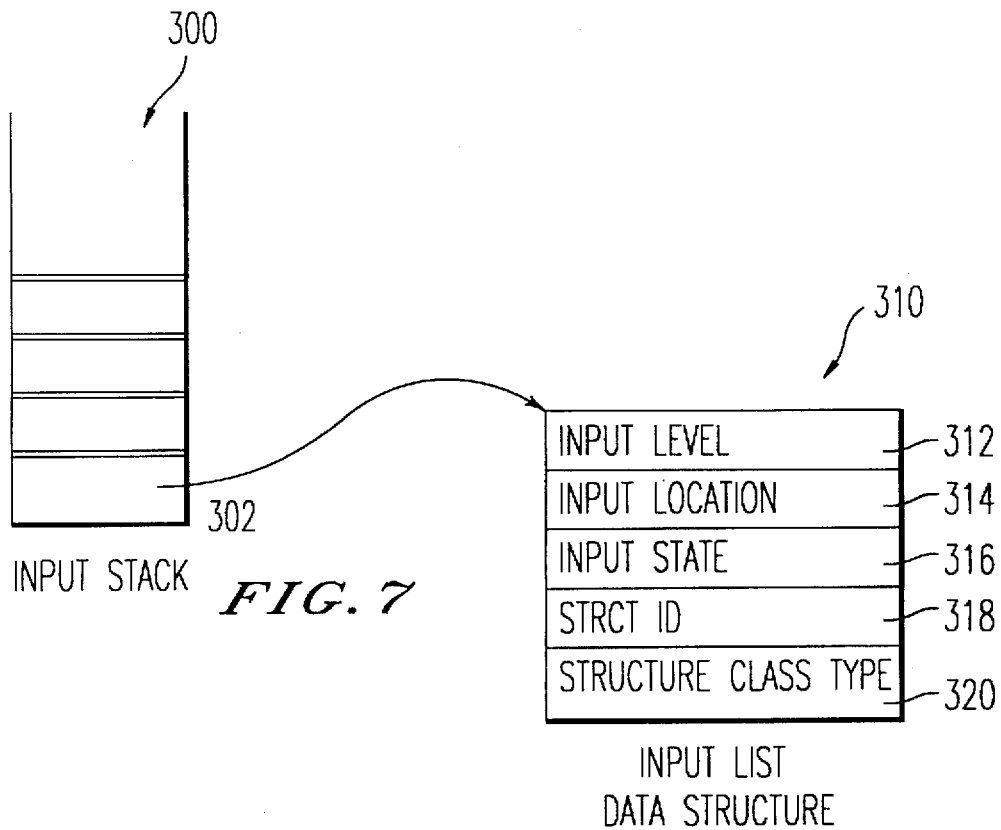
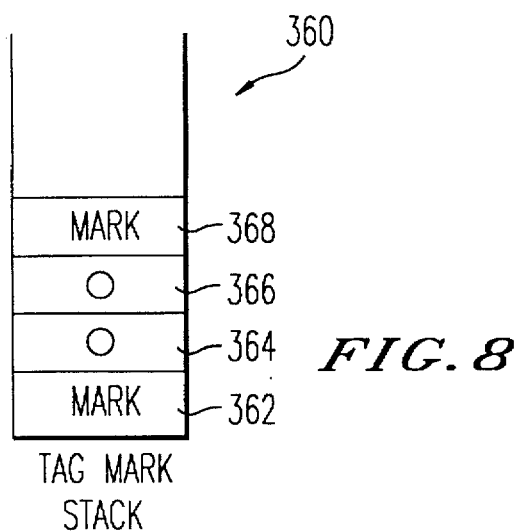

METHOD AND SYSTEM TO PROCESS EXTERNAL ENTITIES IN A DOCUMENT PROCESSING LANGUAGE

CROSS-REFERENCES TO RELATED APPLICATIONS

This application is a continuation-in-part of U.S. patent application Ser. No. 08/158,674, now U.S. Pat. No. 5,448,691, filed on Nov. 29, 1993, and entitled "METHOD AND APPARATUS FOR PROCESSING PAGE SELECTION IN A DOCUMENT PROCESSING LANGUAGE", U.S. patent application Ser. No. 08/146,724, now U.S. Pat. No. 5,422,992, entitled "METHOD AND SYSTEM TO HANDLE STATE VARIABLES IN A DOCUMENT PROCESSING LANGUAGE", filed on Nov. 2, 1993, U.S. patent application Ser. No. 08/148,134, now U.S. Pat. No. 5,483,629, entitled "METHOD AND SYSTEM TO HANDLE DICTIONARIES IN A DOCUMENT PROCESSING LANGUAGE" filed on Nov. 2, 1993, and U.S. patent application Ser. No. 08/119,930, now U.S. Pat. No. 5,446,837, entitled "METHOD AND SYSTEM TO PROCESS RESOURCES IN A DOCUMENT PROCESSING LANGUAGE" filed on Sep. 10, 1993 each of which is a continuation-in-part of U.S. patent application Ser. No. 08/087,571, now U.S. Pat. No 5,499,329, entitled "METHOD AND SYSTEM TO HANDLE CONTEXT OF INTERPRETATION IN A DOCUMENT PROCESSING LANGUAGE" filed on Jul. 2, 1993, which is a continuation-in-part of U.S. patent application Ser. No. 07/931,808, now U.S. Pat. No. 5,416,896, entitled "A METHOD AND SYSTEM TO HANDLE DICTIONARY GENERATION AND CONTEXT DECLARATION IN A DOCUMENT PROCESSING LANGUAGE" filed Aug. 11, 1992, which is a continuation-in-part of U.S. patent application Ser. No. 07/876,601, filed Apr. 30, 1992 and entitled "METHOD AND APPARATUS TO MANAGE PICTURE AND PAGESET FOR DOCUMENT PROCESSING", now U.S. Pat. No. 5,319,748, and U.S. patent application Ser. No. 07/876,251 entitled "METHOD AND SYSTEM TO HANDLE INCLUSION OF EXTERNAL FILES INTO A DOCUMENT PROCESSING LANGUAGE" filed Apr. 30, 1992, now U.S. Pat. No. 5,325,484, each of which is incorporated herein by reference.

BACKGROUND OF THE INVENTION

1. Field of the Invention

The present invention relates generally to computer controlled printing, displaying, or other presentations of documents which may have text, graphical components, and/or images. The invention is more particularly related to a method and system for processing entities which are external to a page description language file, and is more particularly related to a method and system for processing external entities such as external files for the Standard Page Description Language.

2. Discussion of the Background

A Standardized Page Description Language ("SPDL") has been proposed and is being developed as an international standard by the International Organization for Standardization ("ISO"). The draft is known as ISO/IEC DIS 10180, labeled "Information Processing Text-Communication Standard Page Description Language", is available through the American National Standards Institute ("ANSI") in New York, and is incorporated herein by reference. An early version of this document is dated March of 1991 and the current version of this draft is dated December, 1993, each of which is incorporated herein by reference.

One advantage of a hierarchically structured page description language is that when it is desired to have only certain pages or portions of a document printed or processed for presentation, it is not necessary to process the entire document but only portions of the document which are hierarchically above the desired portion of the document to be printed need be processed. In contrast, a popular page description language such as Postscript® requires that the entire portion of the document appearing before the desired portion to be processed before the desired portion can be printed. For larger documents, this can be a significant amount of processing and communication time.

In SPDL, a document being processed can include external entities or structure elements such as an external file. An external structure element is defined by the SPDL draft standard to be a structure element which is available in the environment of the presentation process. The changing of the external entity allows for a "global" type of change to be provided in documents where a library of standardizations can be easily created so that standardized pictures, pages or other formats can be defined for work groups, departments, or enterprise-wide operations.

A complete explanation of the syntactical requirements of external structure elements is found in Chapter 8 of the December 1993 draft standard. The External Declaration is a structure element used to define the external inclusion. The external declaration has the following subordinates; one structure element class identifier, one structure element identifier (strctid), and one location identifier structure element. The structure element class identifier indicates the class of the external inclusion. Examples of classes are a pageset, a picture, a picture body, or a prologue. The structure element identifier (strctid) defines the name of the external inclusion which is referred to while processing.

The SPDL draft standard has certain requirements for processing of external declarations which are set forth in detail in § 8.2.3 of the December 1993 draft standard. Processing of an external declaration structure element requires a binding of the structure element identifier to the external structure element. The scope of the binding is required to be the set of all structure elements in the most immediately superior block which follows the external declaration and all subordinates thereof.

SPDL allows both the use of clear text encoding such as the Standardized Generalized Markup Language ("SGML") and binary encoding such as ASN.1. A tokensequence is a specialized structure element of SPDL which contains content. The content defines the words, characters, graphics, or images of a document, for example.

In an earlier draft of the SPDL standard, the external entity to be included in the document being processed began with <TKNSEQN>, was followed by the content of the tokensequence, and finished with the element </TKNSEQN>. The processing of this type of external entity is described in U.S. patent application Ser. No. 07/876,251 entitled "METHOD AND SYSTEM TO HANDLE INCLUSION OF EXTERNAL FILES INTO A DOCUMENT PROCESSING LANGUAGE", now U.S. Pat. No. 5,325,484 which is incorporated herein by reference.

A newer draft of the SPDL standard now allows the SPDL instance or element to be included at the beginning of an external entity in both clear text encoding and binary encoding. The following is an example of an external entity which is more than just the tokensequence begin and tokensequence end elements.

```
<!DOCTYPE SPDL...>
<SPDL>
    <TKNSEQN>
        .
        .
        .
    </TKNSEQN>
</SPDL>
```

In the above case, it is necessary to process the <!DOCTYPE element and properly handle the <SPDL> and the </SPDL> elements.

An additional feature of the latest SPDL draft is the allowance of an external SGML entity declaration to be used for the clear text encoding.

SUMMARY OF THE INVENTION

A method and apparatus for processing external inclusions in a document processing language. The external inclusions are permitted to have varying formats and each of these varying formats are handled efficiently. A picture/pageset stack is used to keep track of the hierarchical levels of the document and refers to a data structure used for keeping track of the information pertaining to the external inclusion. It is possible for the external inclusion to include other external inclusions and an input stack and an input list data structure is used for keeping track of the various input files which may be open. It is possible for the external inclusion to have a plurality of nested tags having the same name and a tag mark stack is used in order to keep track of these elements within the external inclusion. In order to keep track of an external entity defined within a <!DOCTYPE element occurring at the beginning of an external inclusion, a location entity linked list data structure is used. Different processes including an external input filter process, a process for handling the <!DOCTYPE element, an ending process, and a process for handling the end of the structure ID element are each used in order to efficiently process external inclusions.

The process pertaining to data of the structure ID element obtains the class type and location of the external inclusion which is used by a process of the external input filter. The external input filter process handles the input of the external inclusion and performs various error checks to ensure that the data conforms to the required structure of the external inclusion and keeps track of the tags at each hierarchical level in order to ensure that the end tag of the external inclusion is properly handled.

The function of the DOCTYPE processor is to properly obtain the desired external entity information from the external inclusion when the external inclusion begins with the <!DOCTYPE element.

The external inclusion end routine is used to ensure that the possibility of nested external inclusions are properly handled and manipulates the input stack in order to ensure that after processing the external inclusion, the information which is input thereafter is inputted from the proper source.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A illustrates an exemplary SPDL document having an external inclusion with a local identifier;

FIG. 1B illustrates an exemplary SPDL document having an external inclusion using a public identifier;

FIG. 1C illustrates an exemplary SPDL document having an external inclusion using an object identifier;

FIG. 2 illustrates an exemplary SPDL document having a different class type than FIGS. 1A–1C;

FIG. 3A illustrates an exemplary SPDL document having an external declaration;

FIG. 3B illustrates an exemplary SPDL document having an external inclusion using the "Entity" in the <!DOCTYPE of SGML;

FIG. 4A illustrates an actual SPDL document having an external inclusion using an Entity which appears within the DOCTYPE element;

FIG. 4B is the external file which will be included during processing of the document in FIG. 4A;

FIG. 7 illustrates an input stack and input list data structure used to keep track of the various input sources;

FIG. 8 illustrates the tag mark stack which is used to match a start tag with its corresponding end tag within the external entity;

DESCRIPTION OF THE PREFERRED EMBODIMENTS

Figure 5:
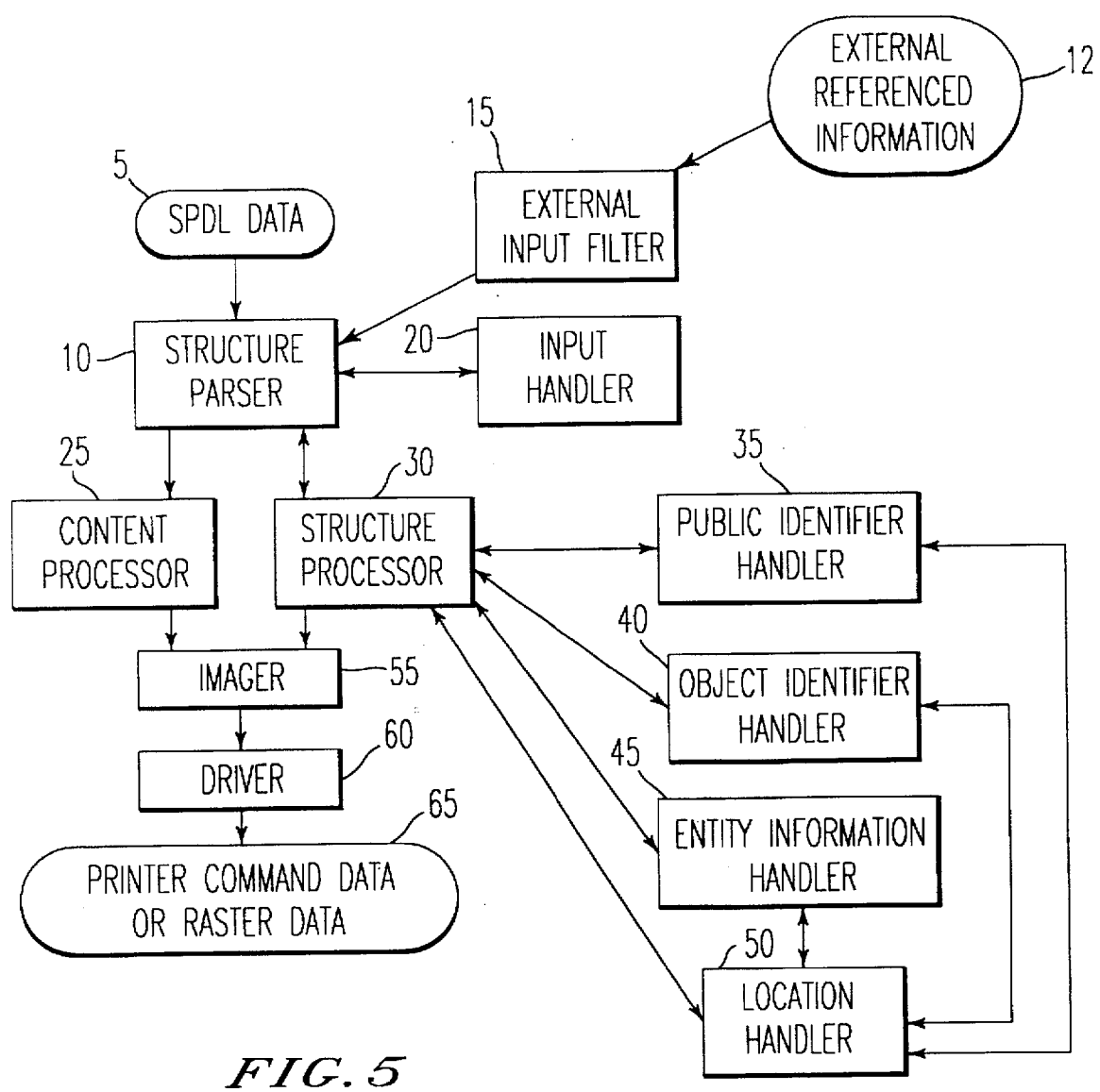
FIG. 5 illustrates a conceptual block diagram of the present invention.

Referring now to the drawings, wherein like reference numerals designate identical or corresponding parts throughout the several views and more particularly to FIG. 1A thereof, there is illustrated an SPDL document having an external inclusion. The purpose of FIGS. 1A–4B is to illustrate different types of input which the present invention can process. Lines 9 through 16 of FIG. 1A illustrate the defining of an external declaration within the prologue at lines 8–17. Line 9 indicates that the class of the external inclusion is a picture. Lines 10–15 associate the structure identifier (strctid) with the location "/externals" in the External Information Data Structure illustrated in FIG. 6. Lines 10–12 indicate the name of the external inclusion which is being defined. Lines 13–15 are used to define the location identifier which may be the external structure element itself, a data element containing the external structure element or indicate the location of the external structure element, or may be a process which can be used to obtain the external structure element. SPDL requires the location identifier structure element to be one of a public location identifier, a local location identifier, or an encoding dependent location identifier. In FIG. 1A, a local location identifier is used. In other Figures, examples of different location identifiers are given.

Lines 18–20 indicate that the external inclusion "MyExternal" previously defined in the prologue will now be processed. It is to be noted that the STRCTID element occurs both at lines 11–13 and lines 19–21. The information concerning the external declaration including the naming and location of the external declaration occur within the prologue at lines 8–17. However, lines 19–21 are required to indicate that the previously defined external inclusion is actually to be used when processing the document and switches the input stream from the current input stream to the previously defined external inclusion.

FIG. 1B is similar to FIG. 1A except that a public identifier is used at lines 13–15 instead of the <LOCLCID> element. The public identifier indicates that the external entity being included is encoded in clear text which can be encoded according to SGML (Standard Generalized Markup Language).

FIG. 1C is similar to FIGS. 1A and 1B except that the location identifier of the external inclusion is an object identifier at lines 13–15. The object identifier means that the object being included is named according to the ASN.1 encoding standard.

FIG. 2 illustrates an external inclusion having a different class type than FIG. 1A. For example, the structure element class identifier of the external inclusion is "CFNTSPC" at line 9, whereas the class at line 9 of each of FIGS. 1A–1C is "PICTURE". In FIG. 2, the declared external reference is not used because there are no lines corresponding to lines 18–20 in each of FIGS. 1A–1C occurring after line 17 in FIG. 2.

FIG. 3A illustrates a further example of an external inclusions in an SPDL file. In FIG. 3A, the location identifier structure element at lines 13–15 indicates that the external inclusion is encoded according to SGML.

FIG. 3B illustrates the external inclusion within the <!DOCTYPE element at line 2 of the listing. The inclusion of the external entity within the <!DOCTYPE element presents additional problems which the present invention must handle. In this Figure, the external inclusion is referenced at line 20 and causes the location "~/externals/contdecl" set forth at line 2 to be used. FIGS. 3A and 3B are examples of an encoding dependent location identifier.

FIG. 4A illustrates an actual example of an external entity which appears within the <!DOCTYPE element at lines 1 and 2 of FIG. 4A. The listing in FIG. 4B is the file which is to be included by the external inclusion commanded by line 2 in FIG. 4A.

A problem which the present invention overcomes pertains to syntax checking within a prologue in an SPDL document. Elements in a prologue of an SPDL document are required to appear in a specific order. This specific order is located within the SPDL draft standard. Certain tokens within the prologue start with "%" and function as a macro and a plurality of elements may be substituted for the element beginning with "%". Some of these elements contain the structure identification element (strctid) and the strctid element is only permitted by SPDL to occur in specific places. Therefore a syntax checking must be performed to determine if the strctid element appears in the proper position. By using the g_FindTypeForStrctid function which is described below, the parser of the input document can obtain information on the type of strctid and determine if the sequence within the prologue is proper.

Figure 13A:
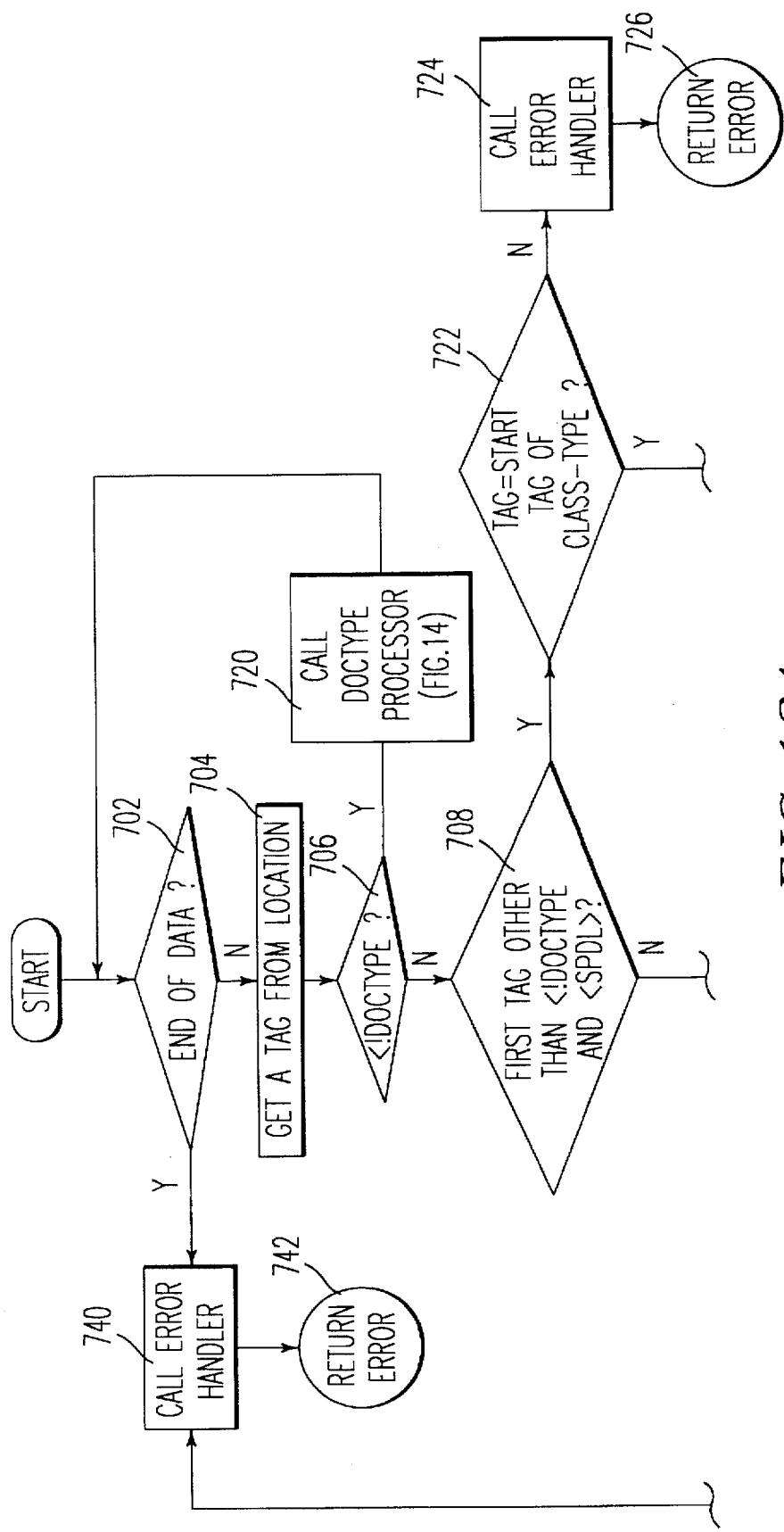
FIG. 13 is a flowchart which illustrates the functions performed by the external input filter.
Figure 13B:
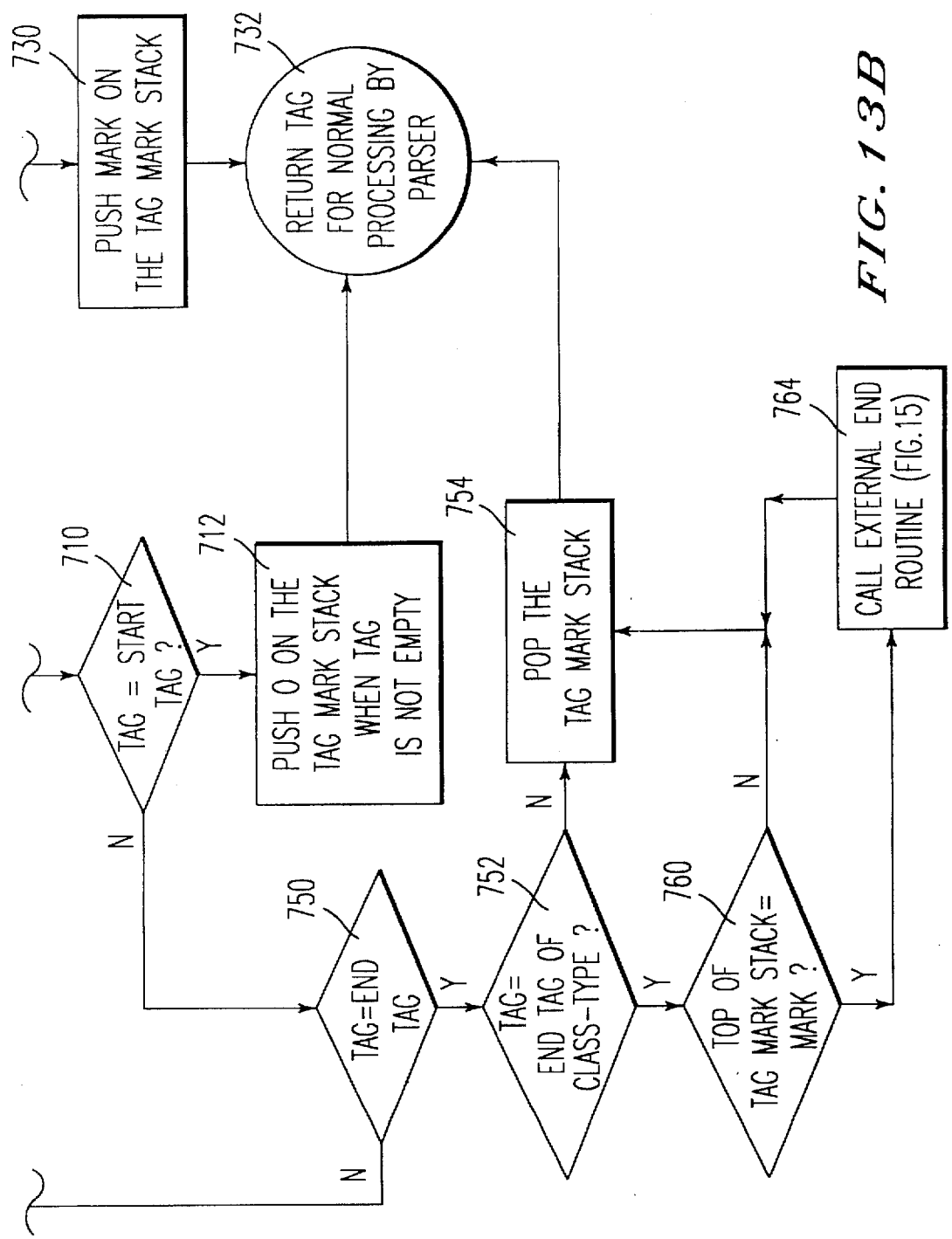

A specific problem which the present invention solves is dealing with structure identification elements appearing under a pageset element. After the pageset element, the prologue or strctid elements appear zero or 1 time followed by the pageset, picture, or strctid element which appear zero or more times. The problem is that when the strctid element appears immediately after the pageset, it is not possible to immediately tell if this strctid element is for the first or second part of the sequence. A similar problem also occurs with the prologue element. The function g_FindTypeForStrctid obtains the structure class type from the external information data structure so that the structure parser can locate the position in the sequence. As an example how the function g_FindTypeForStrctid operates is that if the strctid element follows the pageset element, the function g_FindTypeForStrctid returns the type to be a picture and the structure parser uses this information to position the sequence to be the second position and the prologue is skipped. Moreover, FIG. 13 shows that the included entity should have this type at step 722. This operation will become more clear after the operation of the invention is explained with respect to the flowcharts.

FIG. 5 illustrates a functional block diagram of the various components of the invention. It is to be understood that the illustrated elements are not necessarily separate physical elements but are illustrated as separate elements in order to show the different functions which must be performed within a computer system. SPDL data 5 is ordinarily an input document to be processed. While the invention is described as implementing the processing of the SPDL standard, the processing performed by the invention and data structures used thereby may also be used to process other document production languages. The SPDL data 5 is input by a structure parser 10. The structure parser 10 parses the files input to the system using conventional parsing techniques and a description thereof is omitted for brevity's sake. External referenced information 12 is the external entity or entities which are included into the SPDL data 5. The external referenced information is filtered by an external input filter 15 which is a process for extracting the appropriate information from the external reference information, performs various checks on the external reference information, and filters information contained within the external referenced information which is unnecessary and not desired to be included or processed by the system.

An input handler 20, connected to the structure parser 10, handles the overhead necessary to keep track of the various input sources. The structure parser 10 passes the parsed structure element to the structure processor 30 and the specialized tokensequence structure elements containing content to the content processor 35 which parses and processes the content as appropriate. Connected to the structure processor 30 are a public identifier handler 35, an object identifier handler 40, an entity information handler 45, and a location handler 50. The location handler 50 supports and controls the public identifier handler 35, the object identifier handler 40, and the entity information handler 45. The public identifier handler 35 is usually used for processing clear text external inclusions, the object identifier 40 is usually used for processing binary external inclusions, and the entity information handler 45 is used for manipulating the location entity linked list illustrated in FIG. 9.

The processed content from the content processor 25 and the processed structure from the structure processor 30 are combined in an imager 55 which generates an image of the processed input data. A driver 60, connected to the imager 55, processes the generated image into its final form such as printer command data which includes commands to drive any type of printer such as a Postscript® printer or a Hewlett Packard laser printer, for example, or any other type of printer. The driver can also generate the final image into raster data which can be displayed on a CRT, for example or be sent to a printer as raster data to be printed.

Figure 6:
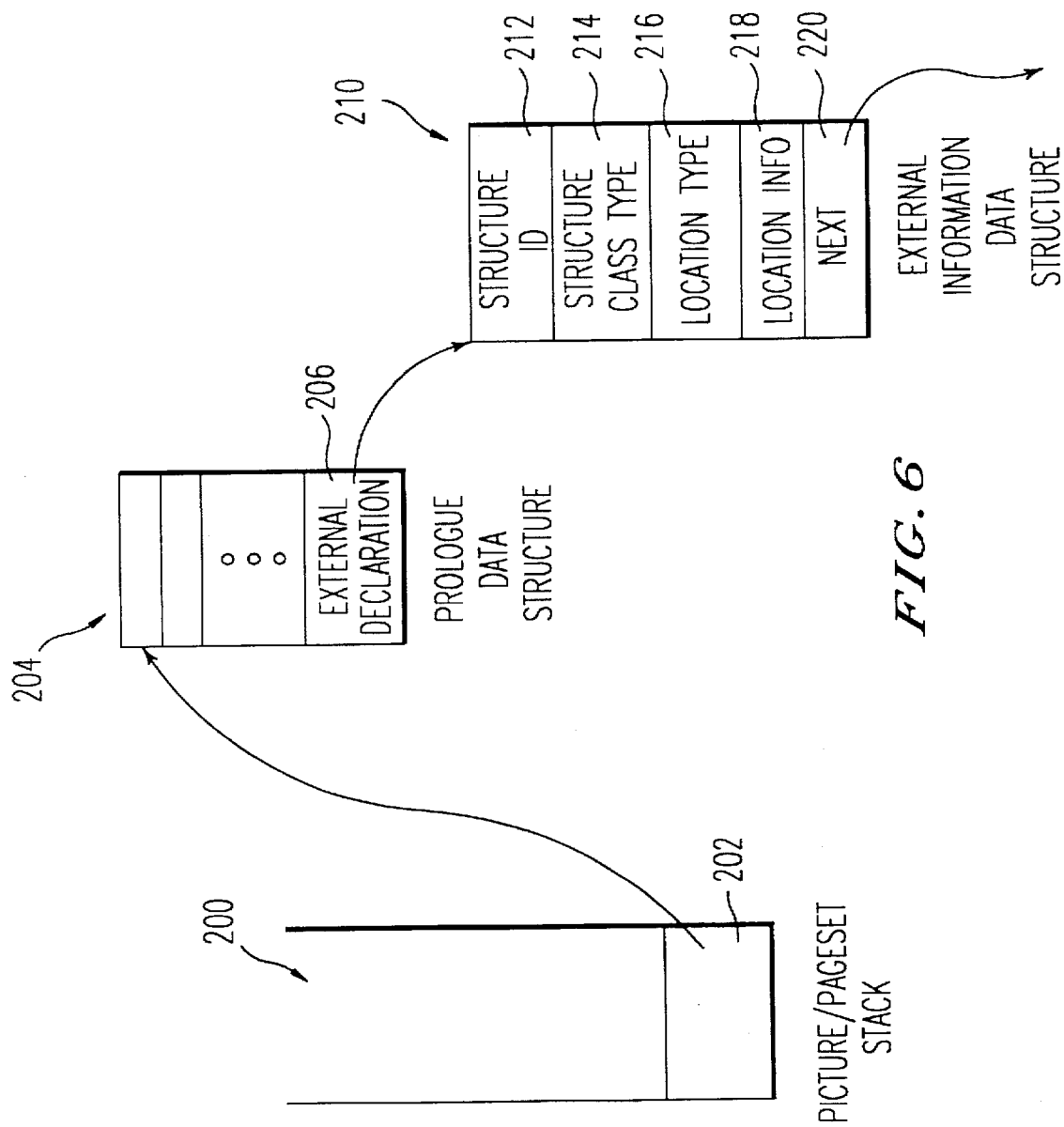
FIG. 6 illustrates data structures used to keep track of the hierarchal levels of the document as the document is being processed.

FIG. 6 illustrates the data structures used when processing an input hierarchically structured document. In SPDL, the various hierarchical levels of a document are defined as pictures or pagesets and the picture/pageset stack 200 illustrated in FIG. 6 contains an entry for each hierarchical level of the document. The entries within the picture/pageset stack 200 such as entry 202 at the bottom level of the stack contain a pointer to a prologue data structure thereof. The pointer 202 points to the prologue data structure 204 which contains various information about the hierarchical level being processed. The prologue data structure 204 contains a pointer to an external declaration 206 which points to an external information data structure 210 which is used for keeping track of various parameters used by an external declaration. The prologue data structure contains additional information such as the picture level or pageset level and contains pointers pertaining to other information which is used during processing of an SPDL document such as state variables and dictionaries. If there is no external declaration within an SPDL document, the external declaration data structure 206 will point to null. If there is one or more external declarations, each external declaration will have its own external information data structure 210 appearing within a chain of external information data structures 210 with the latest external information data structure being pointed to by the pointer 206 within the prologue data structure 204 and the first external information data structure 210 for the hierarchical level will appear at the end of the linked list chain with the next pointer 220 pointing to null.

In the external information data structure 210, the structure ID 212 identifies the external declaration and is for example, the name of the external declaration. The structure class type 214 indicates the structure class of the external declaration (structure element class identifier) and is defined by the clear text attribute "STRCLID". A complete explanation of the structure classes is found in the SPDL draft standard and examples of structure class types include the pageset, picture, picture body and prologue.

The location type 216 and the location information 218 pertain to the location identifier of the external declaration and are contained in the second structure element under the external declaration in an SPDL document (see e.g. lines 13–15 of FIGS. 1A–1C). The different location types include loclid (local location), pubobid with pubid (public identifier), pubobid with objid (object identifier), sgmlext (SGML external syntax), and sgmlent (SGML entity). The type information indicates how to process the location information. For example, the public identifier type should be searched using the "Public Identifier Handler" of the present invention. The location information indicates where the external entity is located.

The last entry in the external information data structure 210 is a next pointer 220 which points to a subsequent external information data structure, if one exists. Otherwise, the pointer 220 points to null.

Details of the operation of the picture/pageset stack and prologue data structure are described in U.S. Pat. No. 5,319,748 entitled "METHOD AND APPARATUS TO MANAGE PICTURE AND PAGESET FOR DOCUMENT PROCESSING" and the other parent applications of the present application, each of which is incorporated herein by reference.

When a plurality of input files are being processed such as the SPDL document and an external inclusion, with the external inclusion possibly including further external inclusions, it is necessary to keep track of the various input files. The input stack 300 and input list data structure 310 illustrated in FIG. 7 are used to keep track of the various input sources. Each time a new input source is referred to by a current input source, the current input source must be pushed onto the input stack and an input list data structure created in order to remember the position and state of the current input file. The input stack 300 is illustrated as containing a pointer 302 for each of the input levels. The pointer 302 points to an input list data structure 310.

The input list data structure 310 has an input level entry 312 which indicates the level at which information is being inputted. The input level can be a number with the first input level being assigned to one and each subsequent input level being incremented by one. The input location 314 indicates the location at which the input file is located. The input state 316 indicates the state of the input stream when the input location is switched. One example of such a state is a file pointer and file position. In a large data base, the input state may be the data position. The nature of the input state will change depending on the nature of the type of input stream.

Figure 19A:
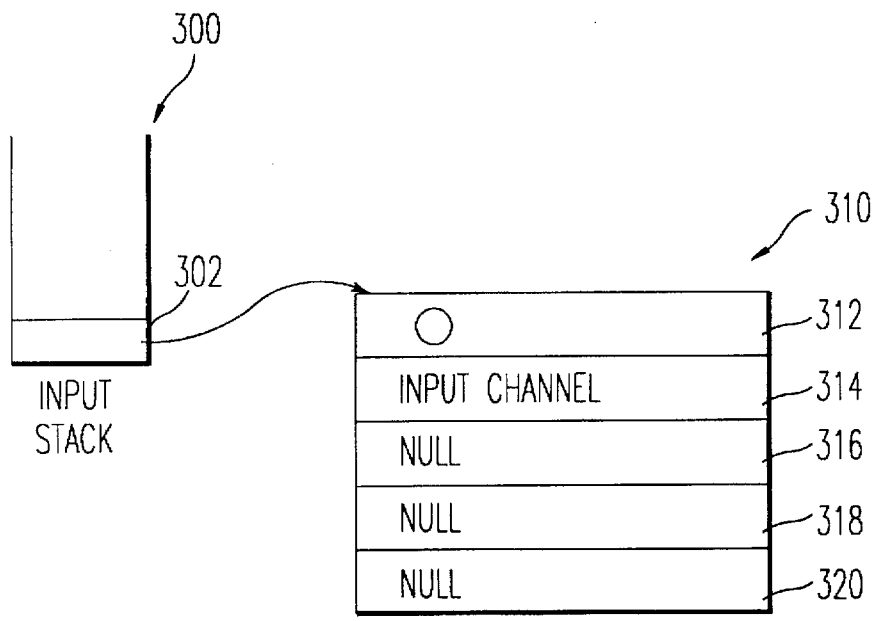
FIG. 19A illustrates the input stack and input list data structure upon the beginning of processing of a document.

When an SPDL file is initially being processed, the input stack has one entry as shown in FIG. 19A. When there is an external inclusion which is a new input source to be used (e.g., at lines 18–20 of FIG. 1A), the current input state is saved in the top entry, an entry is pushed onto the input stack 300 and an input list data structure 310 is created which contains information about the SPDL file. If the external inclusion refers to or includes another external inclusion, the information regarding the first external inclusion is pushed onto a second level of the input stack and a second input list data structure is created. When the second external inclusion is finished being processed and processing of the first external inclusion continues, the second entry on the stack is popped off while retaining the first entry regarding the SPDL file. When the first external inclusion is finished being processed, the first entry on the input stack would then be popped off and discarded.

FIG. 8 illustrates a tag mark stack 360 which is used for matching start tags with the corresponding end tags for external inclusions. For example, if the external inclusion is a picture structure element, the picture in turn may contain additional pictures as subordinates. If upon the first occurrence of the end tag of a picture the processing of the inclusion is terminated, there will be improper termination of the external inclusion because the picture nested within the first picture will be terminated without a proper termination of the first picture element of the external inclusion. The tag mark stack is used by the external input filter in order to keep track of the elements within the external inclusion. Each time a start tag after the mark start tag is encountered O, is pushed in the stack if it is not empty. When the end tag is encountered, the top entry of the stack is popped off.

The bottom entry 362 in the tag mark stack 360 is MARK, corresponding to the beginning of the first hierarchical level of an external inclusion. Entries 364 and 366 contain O, indicating other hierarchical levels of the external inclusion. The top entry 368 in the stack contains MARK. This MARK may be created when the external entity itself calls the inclusion of another entity.

Figure 9:
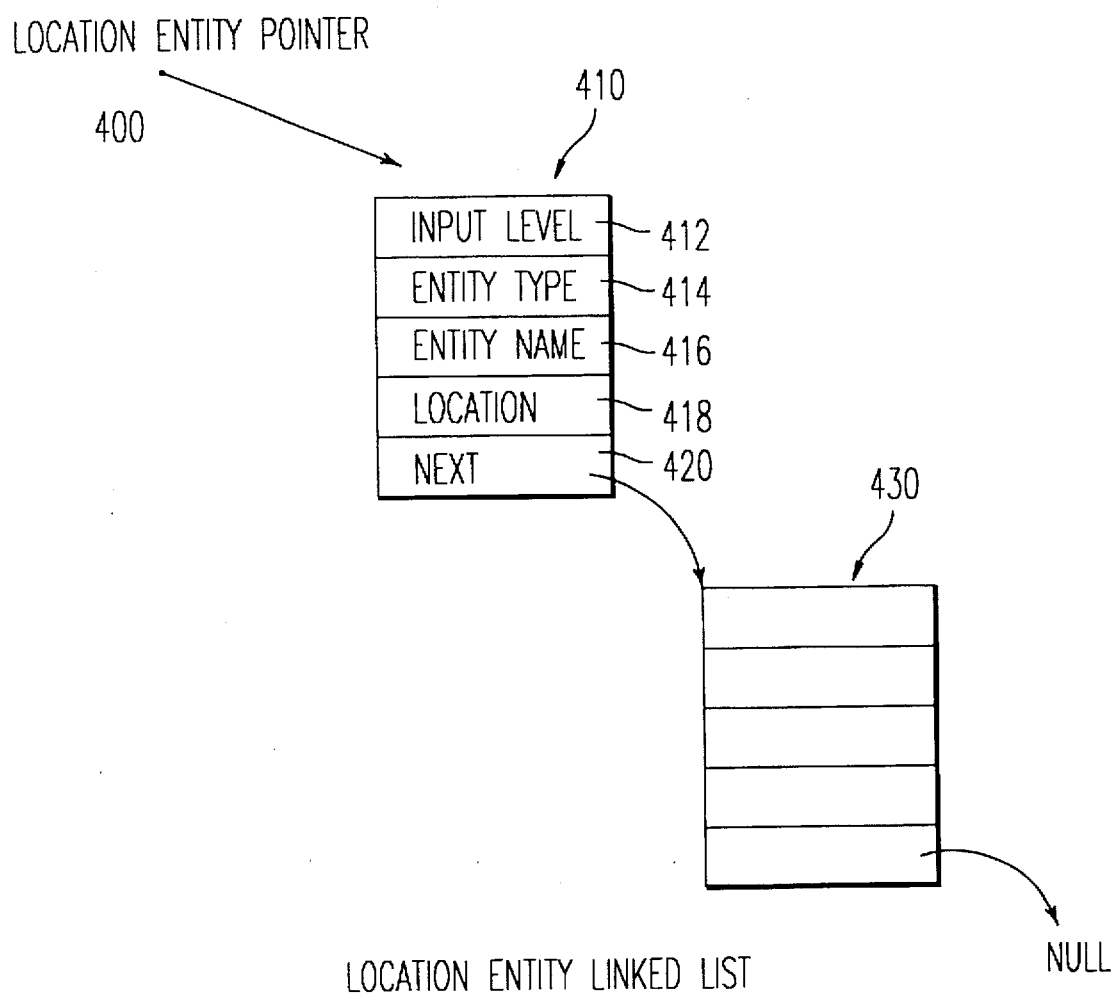
FIG. 9 illustrates the location entity linked list which is used to keep track of the entity declared within the <!DOCTYPE.

FIG. 9 illustrates a location entity linked list which is used to manage external entities declared within the <!DOCTYPE element. As described above with respect to FIG. 7, there can be a plurality of levels of external inclusions. For each level of inclusion, there may be external entities in the <!DOCTYPE element that are effective during a particular level. The linked list data structure illustrated in FIG. 9 keeps track of the various external inclusions and places the most recently used external inclusion at the address pointed to by the location entity pointer 400 while shifting each of the previous location entity linked lists down by one. The most recently used external entity is referred to by the location entity pointer 400. Each entry within the location entity linked list such as linked list 410 or 430 contains an entry 412 indicating the input level, an entry 414 indicating the entity type, an entry 416 indicating the name of the entity, an entry 418 indicating the location of the entity, and a pointer 420 which points to a subsequent location entity linked list data structure such as data structure 430 or points to null if the location entity linked list is last in the linked list chain.

The illustrated flowcharts contain function names in order to prevent the need to write out a complete description of each of the functions. The functions used by the invention and a brief description thereof are set forth in the table below.

TABLE g_FindTypeForStrctid(STRING strctid)
    Returns the structure class type.
g—FindLocationForStrctid(STRING strctid)
    Returns information on where to get the input.
g_PutLocationEntity(STRING EntityName,LOC_TYPE type,
LOC_INFO location, int InptLevel)
    Insert the Location Entity information in the
    Location Entity linked list.
g_DeleteLocationEntity(int InputLevel)
    Delete the Location Entity information with the
    InputLevel from the Location Entity linked list.
g_PutExternalDecl(STR_CLASS class, STRING strctid,
LOC_TYPE type, LOC_INFO location)
    Insert an External Information Data Structure.

The function g_FindTypeForStrctid is used to obtain the structure class type of the external inclusion. This is obtained by examining field 214 in the external information data structure 210 illustrated in FIG. 6.

The function g_FindLocationForStrctid returns the information regarding where to get the external inclusion which is found in field 218 of the external information data structure 210 illustrated in FIG. 6.

The function g_PutLocationEntity inserts the location entity information in the location entity linked list illustrated in FIG. 9. This function creates a new location entity link list data structure such as are illustrated in FIG. 9 and inserts this information between the first location entity link list data structure and the location entity pointer 400.

Figure 10A:
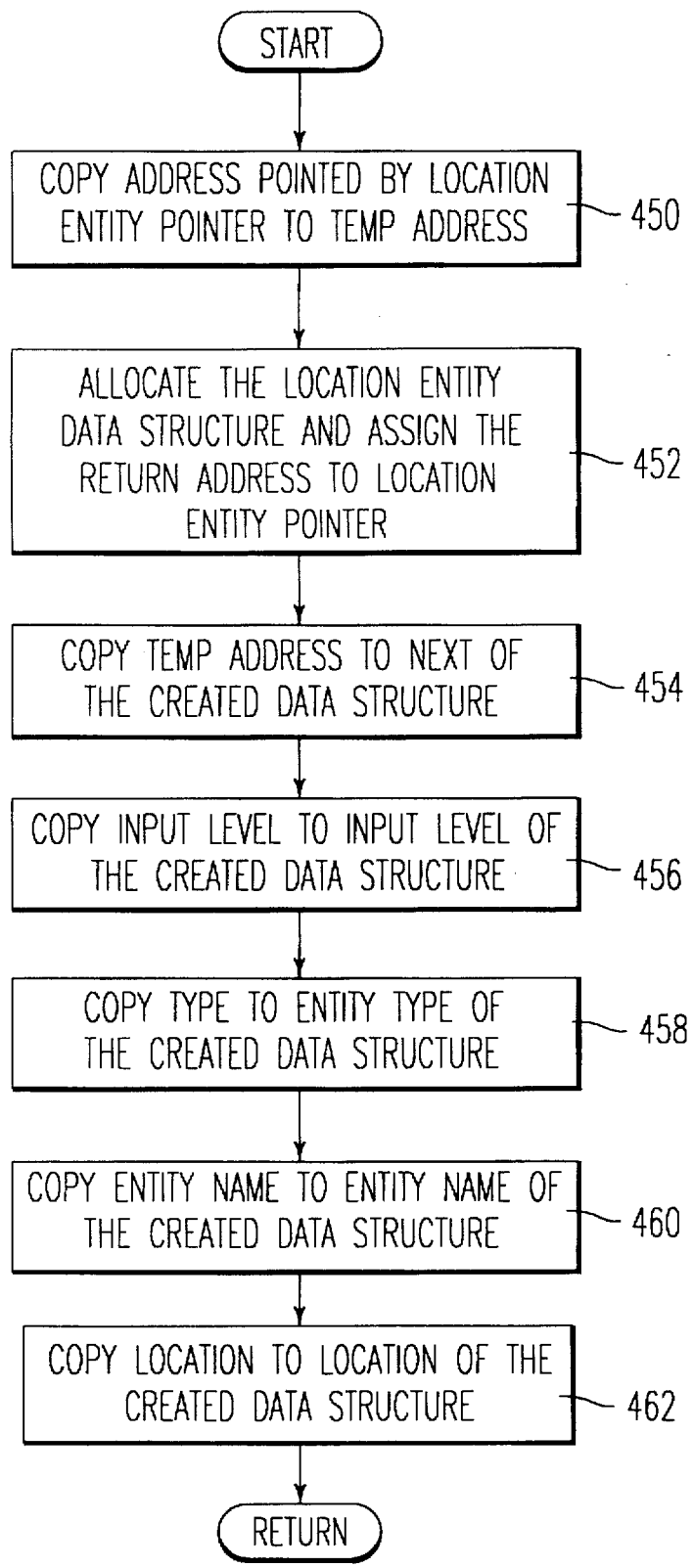
FIG. 10A illustrates a flowchart which is executed when the function g_PutLocationEntity is executed.

FIG. 10A illustrates a flowchart showing the process of the g_PutLocationEntity function. After starting, step 450 temporarily stores the location entity pointer 400 in the location TempAddress. Step 452 allocates a new location entity data structure and assigns the address of the newly allocated data structure to the location entity pointer 400. Step 454 copies the temporary storage location TempAddress to the Next entry of the newly created data structure. Step 456 copies the current Input Level to the Input Level entry of the newly created data structure. Step 458 copies the type of the external declaration to the Entity Type entry of the newly created data structure. Step 460 copies the Entity Name of the external declaration to the Entity Name entry of the newly created data structure. Step 462 copies the location of the external declaration to the Location entry of the newly created data structure. Flow then returns to the calling process.

Figure 10B:
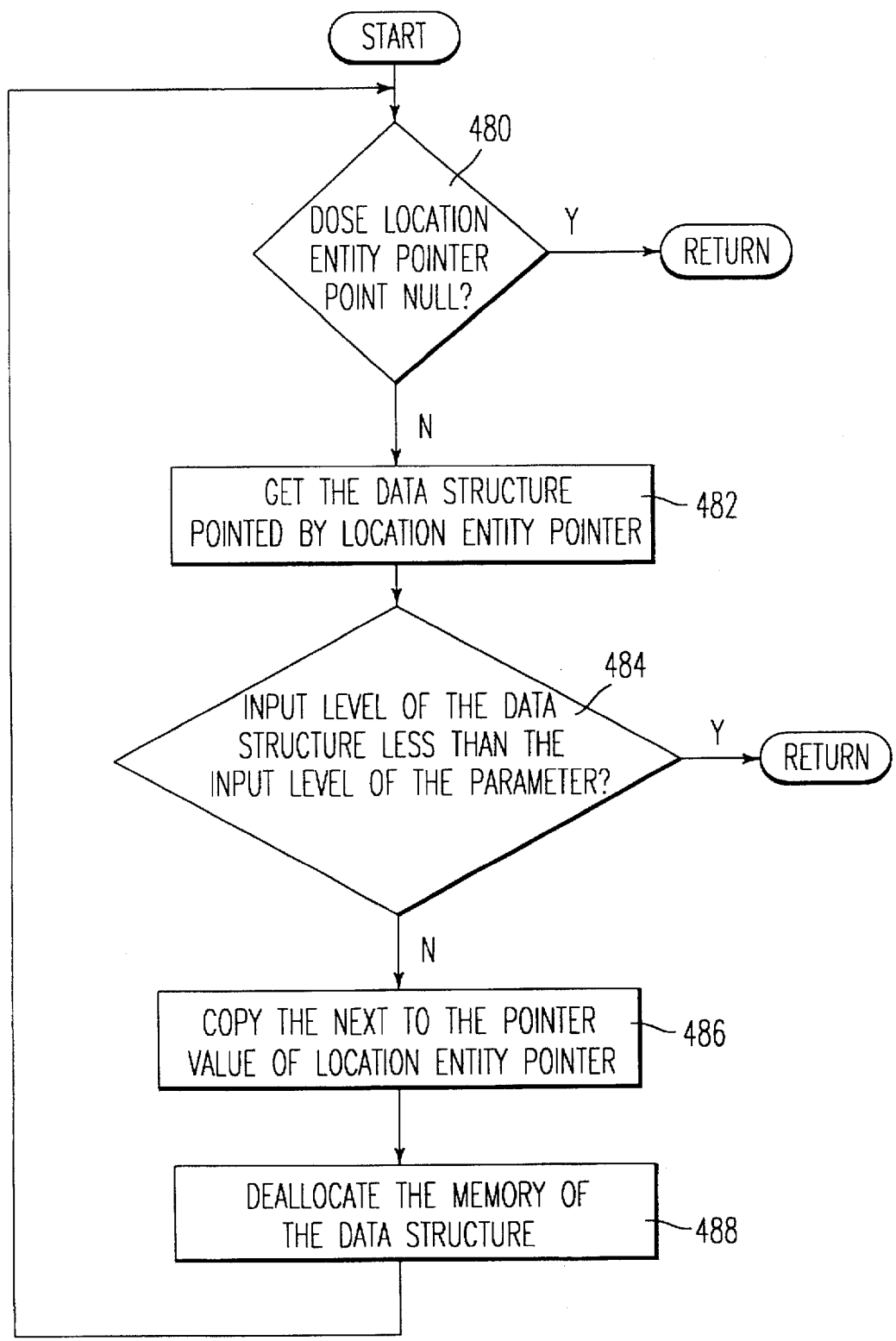
FIG. 10B illustrates a flowchart which is executed when the g_DeleteLocationEntity function is executed.

The function g_DeleteLocationEntity deletes the location entity information having the InputLevel equal to or above the specified value from the location entity linked list illustrated in FIG. 9. The flowchart of FIG. 10B illustrates the process performed when the g_DeleteLocationEntity is executed. After starting, step 480 determines if the location entity pointer points to null. If it does, flow returns to the calling process as there is no location entity data structure to be deleted. If it does not, flow proceeds to step 482 which obtains the data structure pointed to by the Location Entity Pointer 400. Step 484 then determines if the Input Level of the data structure pointed to by the Location Entity Pointer 400 is less than the InputLevel parameter specified when the function was called. If this is the case, flow returns to the calling process. If it is not, the pointer in the Next entry of the location entity data structure is copied to the Location Entity Pointer 400. Step 488 then deallocates or releases the memory of the location entity data structure and flow returns to step 480.

The function g_PutExternalDecl is used to build and insert the external information data structure such as 210 illustrated in FIG. 6 at a position which is pointed to by pointer 206 and places the information within the data structure 210. The general method of performing this function is analogous to the subject matter disclosed in U.S. Pat. No. 5,325,484 and U.S. patent application Ser. No. 07/931, 808, and other related co-pending patent applications, each of which is incorporated hereby by reference.

Figure 11:
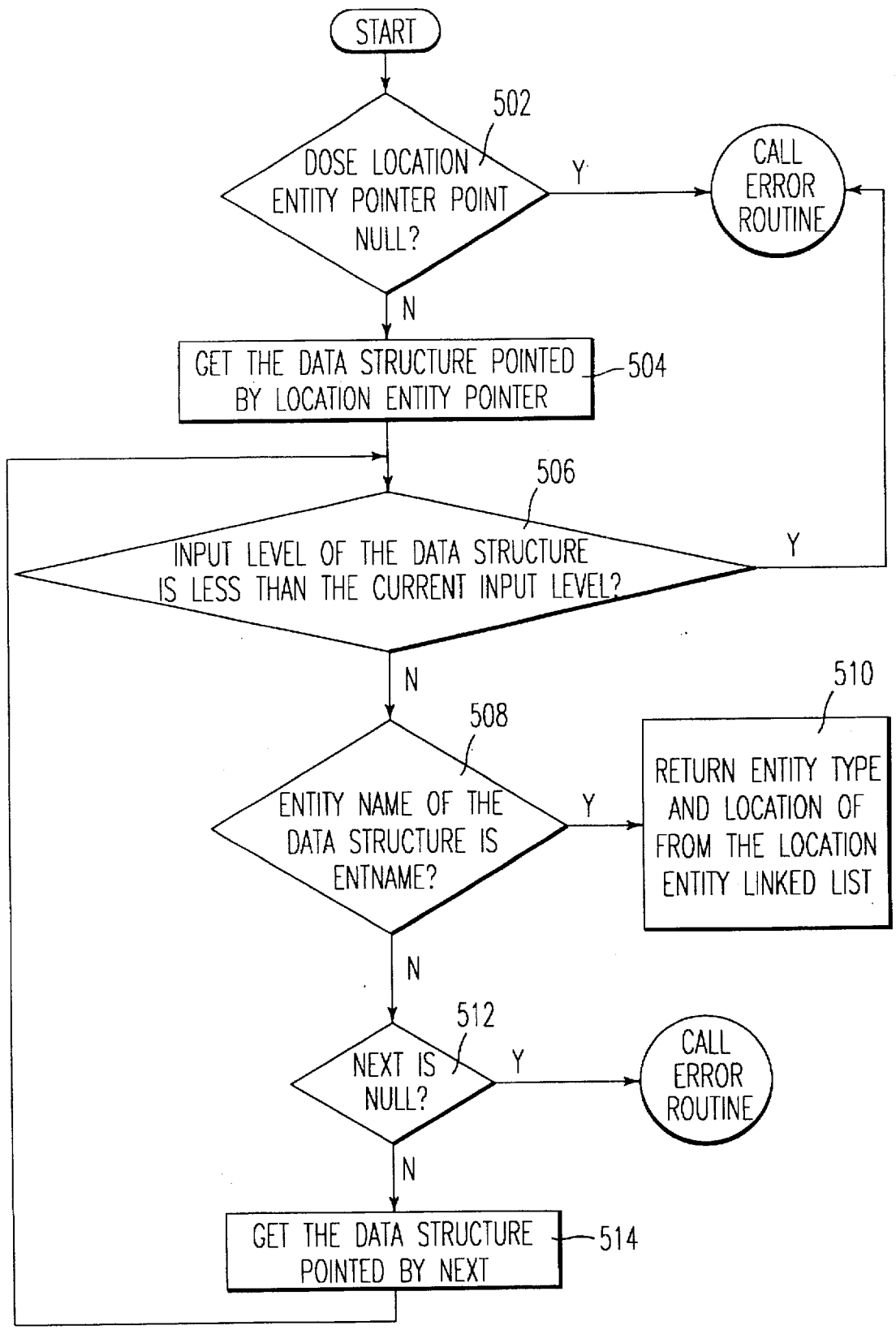
FIG. 11 illustrates a flowchart called when an External Declaration element is processed which refers to information defined in the <!DOCTYPE tag at a beginning portion of a document in order to retrieve information which has been stored in the location entity linked list.

The method of creating the external information data structure is as described in the related applications for similar data structures and simply copies information pertaining to the external declaration into the external information data structure. However, one complication arises when information pertaining to the external declaration is defined at the beginning of a file in the doctype element. The flowchart illustrated in FIG. 11 handles obtaining the information which was included at the beginning of the document in the doctype element when the external declaration is later encountered. An example of when the flowchart of FIG. 11 is called is when line 20 of FIG. 3B or line 11 of FIG. 4A is executed. In both of these figures, line 2 contains information pertaining to the external declaration which was written in the location entity linked list. When the above described lines are encountered, step 502 of FIG. 11 determines if the Location Entity Pointer 400 points to null. If it does, there is an error and an error routine is called because the information which is needed in the location entity linked list does not exist. If there is no error, step 504 obtains the location entity data structure pointed to by the Location Entity Pointer 400. Step 506 then examines if the Input Level entry of the data structure is less than the current Input Level. If it is, there is an error as the information which is obtained must be at the same level as the Input Level. If there is no error, flow proceeds to step 508 which determines if the Entity Name contained within the data structure is the same as ENTNAME. This variable ENTNAME is seen at line 20 of FIG. 3B and line 11 of FIG. 4A. If the entity names match, flow proceeds to 510 and the needed information is found in the location data structure. Step 510 returns the Entity Type and Location from the location entity linked list and the process is terminated. If the names do not match, flow proceeds to step 512 which determines if the Next entry within the location entity linked list is equal to null. If it is, the needed information has not been found in the location entity linked list and an error exists. If Next is not null, step 514 is executed which obtains the data structure pointed to by the pointer Next and flow proceeds back to step 506. In this manner, the needed information pertaining to the previously defined external declaration is obtained from the location entity linked list.

Figure 12:
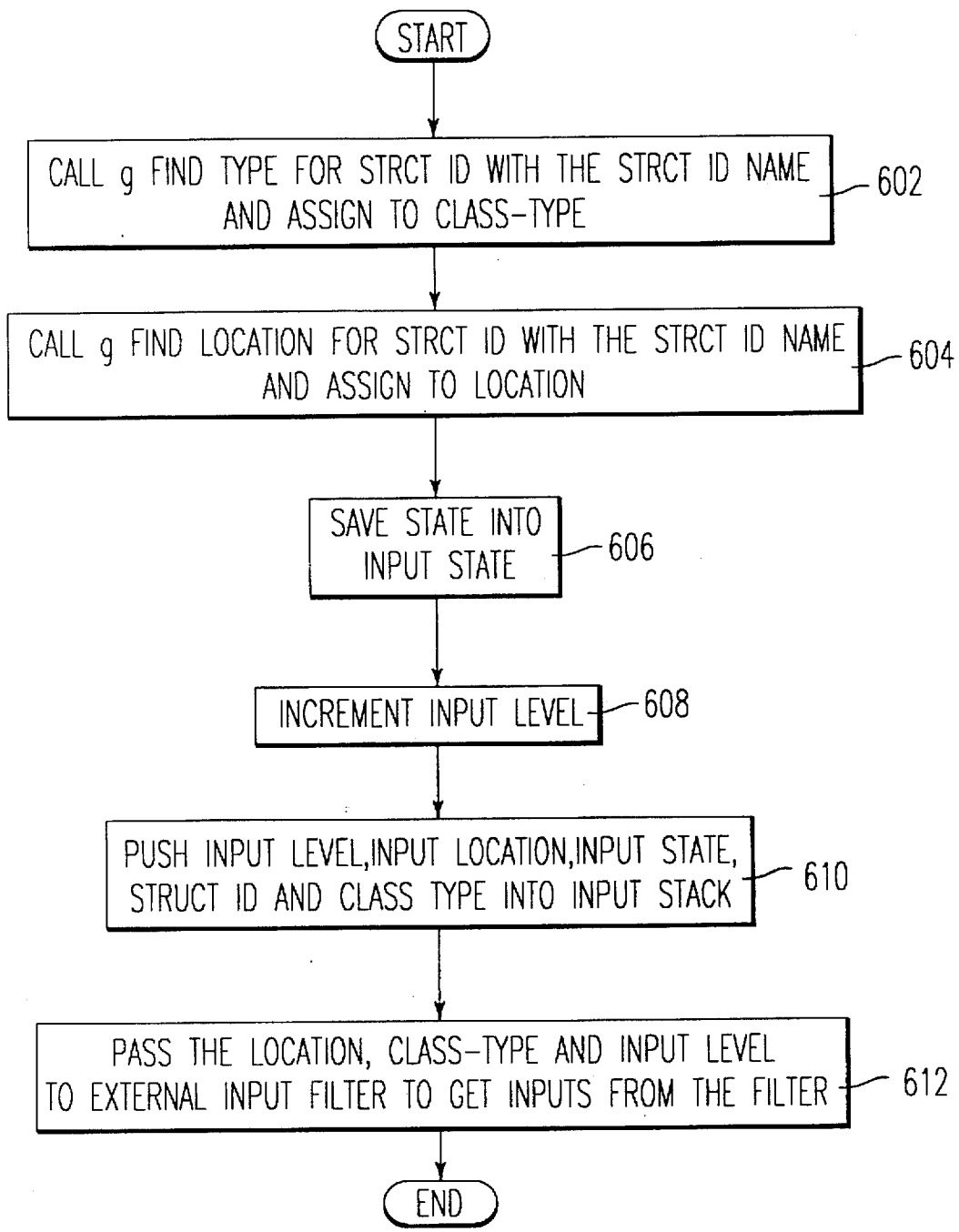
FIG. 12 illustrates a flowchart which is called when the strctid element is outside of the extdecl element.

FIG. 12 illustrates the processing performed after the end of a structure ID element (</STRCTID >) which is not within an external declaration. This flowchart is called in order to process the information contained within the previously defined external inclusion. For example, in FIG. 1A, the flowchart of FIG. 12 would be called after the processing of line 20. The flowchart would not be called after line 12 because the structure ID elements at lines 10–12 are within the external declaration occurring at lines 9–16.

In FIG. 12, step 602 calls the function g_FindTypeForStrctid with Strctid name and assigns the returned structure class type to the variable class_type. Step 604 calls the function g_FindLocationForStrctid with the Strctid name and assigns the returned information which indicates where to get the input to the variable Location. The input level is a global variable initialized to be zero at power on or a reset condition. Step 606 saves the state into the variable Input State for later use in field 316 of the input list data structure illustrated in FIG. 7. Step 608 then increments the input level variable, indicating that an additional external inclusion is to be performed. Step 610 then handles the processing of the input stack illustrated in FIG. 7 and pushes a new level onto the input stack and creates an input list data structure which includes all parameters found in the input list data structure. This step saves the current input information before the new information to be inputted is obtained. Step 612 then passes the variables Location, and Class_Type, respectively determined in steps 604 and 602 and the input level determined in step 608 to the external input filter, the process of which is illustrated in FIG. 13. Flow then returns to the calling process.

Figure 14:
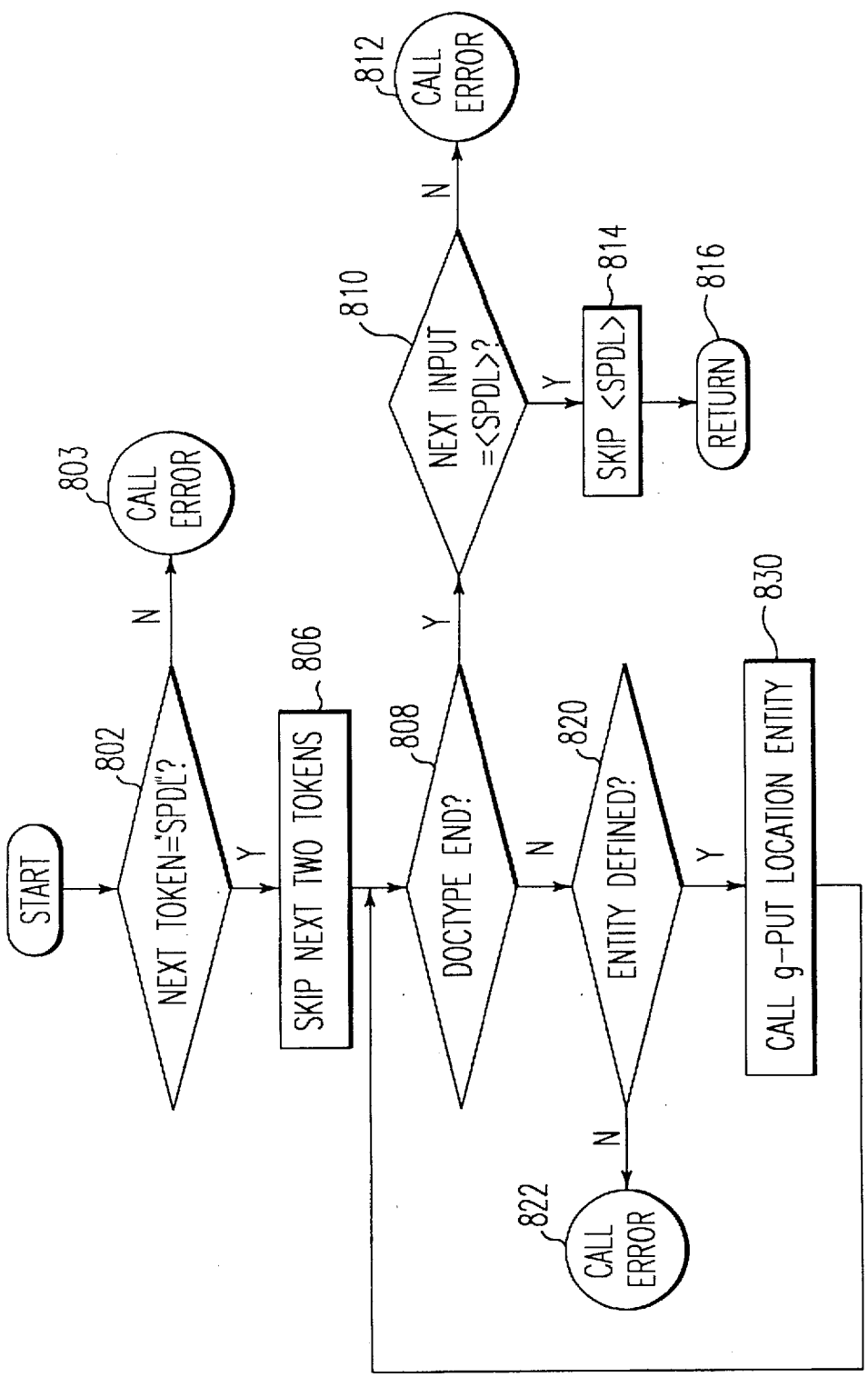
FIG. 14 is a flowchart illustrating the functions performed by the doctype processor.

The flowchart in FIG. 13 illustrates the functions performed by the External Input Filter 15 illustrated in FIG. 5. The flowchart of FIG. 13 is called whenever a structure element is being inputted from an external inclusion. The filter allows the necessary data to be read in while filtering out the data not needed by the structure processor. In FIG. 13, step 702 determines if there is more data to be input. If the end of the data being inputted has been reached, there is an error because SPDL does not permit the data to end at this point and steps 740 and 742 handle error processing. If there is more data, flow proceeds to step 704 which gets the first tag from Location which was determined in step 604 of FIG. 12. The Location is where the external inclusion is located. Step 706 then examines if the first tag is the <!DOCTYPE element. If it is, special processing must be performed and the flowchart of the DOCTYPE processor illustrated in FIG. 14 is called. If the first tag is not <!DOCTYPE, flow proceeds from step 706 to step 708.

Step 708 determines if the input tag is the first tag besides the <!DOCTYPE and <SPDL> elements. The first time through the flowchart, the tag will always be the first tag and flow will proceed to step 722. After the first time through the flowchart, flow will proceed from step 708 to step 710.

Step 722 examines if the first tag is the start tag of the variable class_type determined in step 602 of FIG. 12. If it is not, an error has occurred and step 724 performs error handling and the error information is returned in step 726. If step 722 does detect the proper tag, flow proceeds to step 730 which pushes MARK onto the tag mark stack illustrated in FIG. 8. As previously explained, the tag mark stack is used to keep track of the matching of start and end tags of the external entity being processed. After step 730, step 732 returns the tag for normal processing of the parser. After the parser processes the data using conventional parsing techniques, it is necessary to again call the process of the external input filter illustrated in FIG. 13 to process the next element of the external inclusion.

If step 708 determines that the first tag is not being processed, flow proceeds to step 710 which examines if the tag is a start tag. In clear text processing, elements will usually begin with a start tag followed by certain information related to the type of element and end with an end tag. If the tag is a start tag, flow proceeds to step 712 which pushes a 0 onto the tag mark stack when the tag is not empty in order to indicate that a new element is being processed besides the first structure tag of the external inclusion. Note that an empty start tag does not have a matching end tag. Flow then proceeds to step 732 which returns the tag from the external inclusion to the parser for parsing and processing.

If step 710 determines that the input tag is not a start tag, flow proceeds to step 750 which examines if the tag is an end tag. If it is not, there is an error as the flowchart of FIG. 7 handles only start tags and end tags and flow proceeds to step 740 which calls the error handling process and step 742 returns the indication of an error. If step 750 determines that the tag being processed is an end tag, there is no error and flow proceeds to step 752 which determines if the tag being processed is the end tag of the class_type determined in step 602. If the tag is not the end tag of the class_type, the tag being processed cannot be the last tag of the external inclusion and flow proceeds to step 754 which pops the top entry off of the tag mark stack and flow proceeds to step 732 to process the element. If step 752 determines that the tag being processed is the end tag of the class_type, flow proceeds to step 760 which determines if the top of the tag mark stack contains the entry MARK. If it does not, the end of the external inclusion has not been reached as the end tag for the first start tag has not been reached and flow proceeds to step 754 which pops the tag mark stack and then to step 732 for processing of the tag. If step 760 determines that the top of the tag mark stack contains the entry MARK, there is an end of the external inclusion and flow proceeds to step 764 which calls the external inclusion end routine illustrated in FIG. 15. After flow returns from the external inclusion end routine illustrated in FIG. 15, step 754 is executed.

FIG. 14 illustrates the process performed by the DOCTYPE processor which is called by step 720 of FIG. 13. The flowchart illustrated in FIG. 14 is used for handling external inclusions which begin with the <!DOCTYPE element.

After starting in FIG. 14, step 802 examines if the next token or next portion of the external inclusion contains the letters SPDL. If it does not, there is an error because the letters SPDL must follow the <!DOCTYPE element and an error is indicated in step 803.

Step 806 then skips the next two tokens of the external inclusion. A token in this writing is used in its ordinary sense and refers to a unit for language processing.

Step 808 then examines if the next element is the end of the DOCTYPE element. If it is, flow proceeds to step 810 which examines if the next input element is the <SPDL> element. If it is not, there is an error because the end of the DOCTYPE element must be preceded by the <SPDL> element. If it is not, step 812 performs the necessary error handling. If the next element is the <SPDL> element, step 814 skips this element as it does not contain information which will affect processing but merely labels the type of file. Flow then returns to the calling process in step 816.

If step 808 does not detect the end of the DOCTYPE element, flow proceeds to step 820 which determines if the entity has been defined within the <!DOCTYPE element. If an external entity was not previously defined, there is an error as the document does not conform to SPDL requirements and step 822 handles the processing of the error.

If step 820 determines that the entity is defined, step 830 calls g_PutLocationEntity after extracting the necessary information from the input data. The function g_PutLocationEntity inserts the location entity into the location entity linked list which is illustrated in FIG. 9. The location entity linked list is used to keep track of the entities defined within the <!DOCTYPE element as illustrated at line 2 of FIG. 4A. Flow then returns back to step 808 for additional processing.

Figure 15:
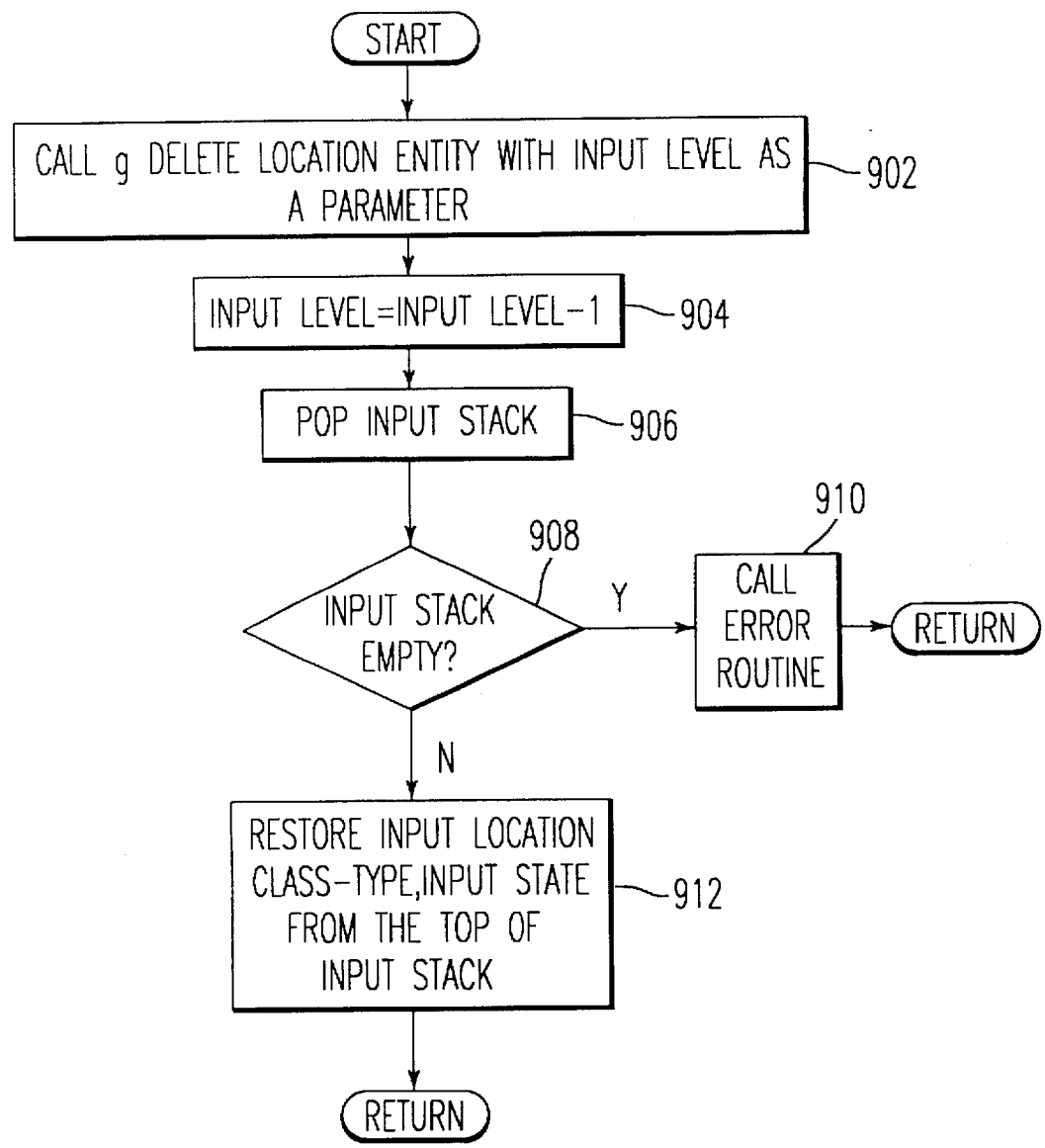
FIG. 15 is a flowchart illustrating the external end routine.

FIG. 15 contains a flowchart illustrating the process used for handling the end of the external inclusion. This process is called by step 764 of FIG. 13. After starting, step 902 calls the function g_DeleteLocationEntity with the InputLevel as a parameter. This deletes the location entity information from the location entity link list data structure illustrated in FIG. 9. Step 904 then decrements the InputLevel by one. Step 906 then pops the top entry off of the input stack illustrated in FIG. 7 because the external inclusion is finished processing. Step 908 determines if the input stack is empty. If it is, an error has occurred because the bottom entry of the input stack should refer to the SPDL file which reads in or refers to the external inclusion. If step 908 determines that the input stack is not empty, flow proceeds to step 912 which restores the input location, the class_type, and the input state at the top of the input stack so that processing of the file at the top of the stack can continue. Flow then returns to the calling process.

Figure 16:
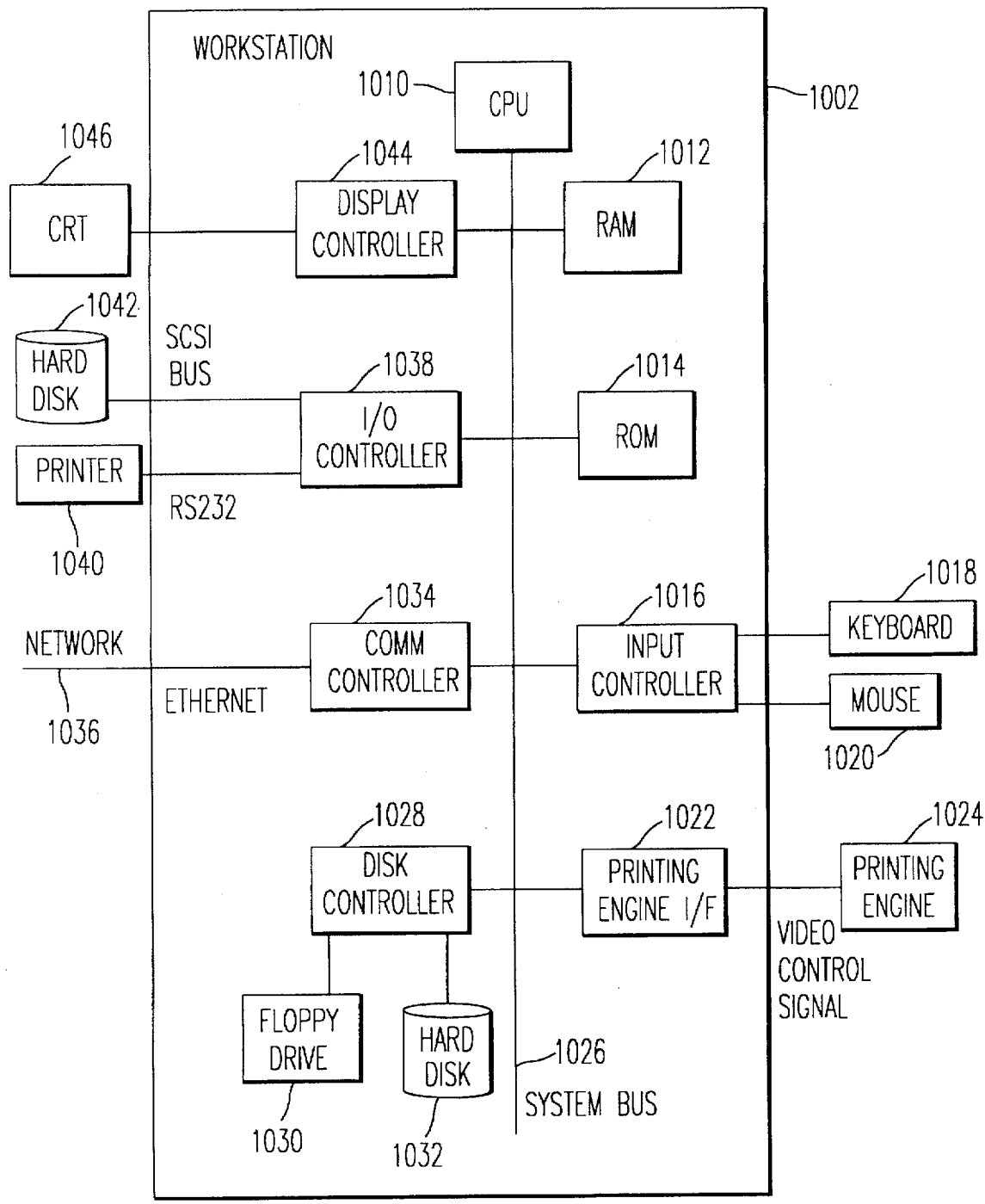
FIG. 16 is an exemplary hardware embodiment of the present invention.

FIG. 16 illustrates the hardware components of a computer which can be used to embody the present invention and execute the process of the invention. A computer embodying the present invention can be a workstation such as workstation 1002. The workstation 1002 includes a CPU 1010, ram 1014, an input controller 1016 connected to a keyboard 1018 and a mouse 1020. A printing engine interface 1022 is connected directly to a printing engine 1024 which receives video and control signals for rasterized image data transmitted by the printer engine interface 1022, for example. The work station further contains a disk controller 1028 connected to a floppy drive 1030 and a hard disk 1032. A communication controller 1034 is for connection to a network 1036 which can be for example, an Ethernet network. An I/O controller 1038 is connected to an external hard disk 1042 through an SCSI bus, for example and a printer 1040, connected through an RS232 cable. The work station also contains a display controller 1044 connected to a CRT 1046. A system bus 1026 connects the elements within the work station.

Figure 17:
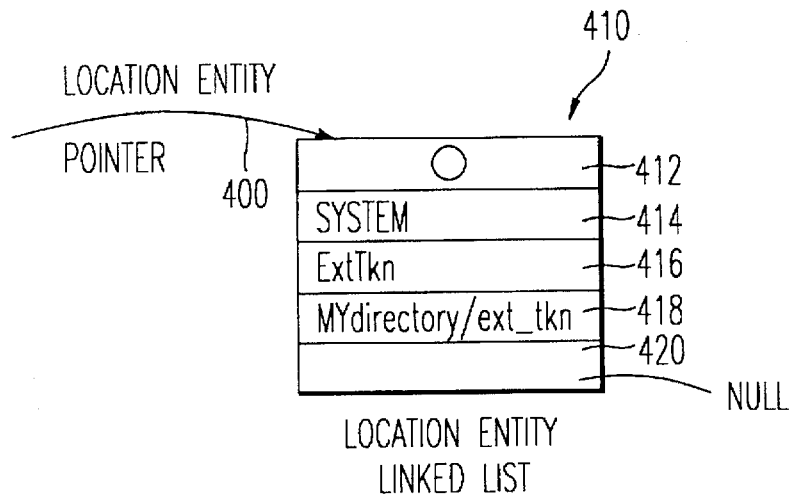
FIG. 17 illustrates the location entity linked list after processing line 2 of the example illustrated in FIG. 4A.

FIGS. 17-20B illustrate various data structures used as the example illustrated in FIGS. 4A and 4B is processed. FIG. 17 illustrates the location entity linked list 410 after processing line 2 of FIG. 4A. In FIG. 17, the location entity pointer 400 points to location entity linked list 410 which has the input level 412 as 0, the entity type 414 as system, the entity name 416 as ExtTkn, the location of the external entity 418 is mydirectory/ext_tkn, and the pointer 420 points to null.

Figure 18:
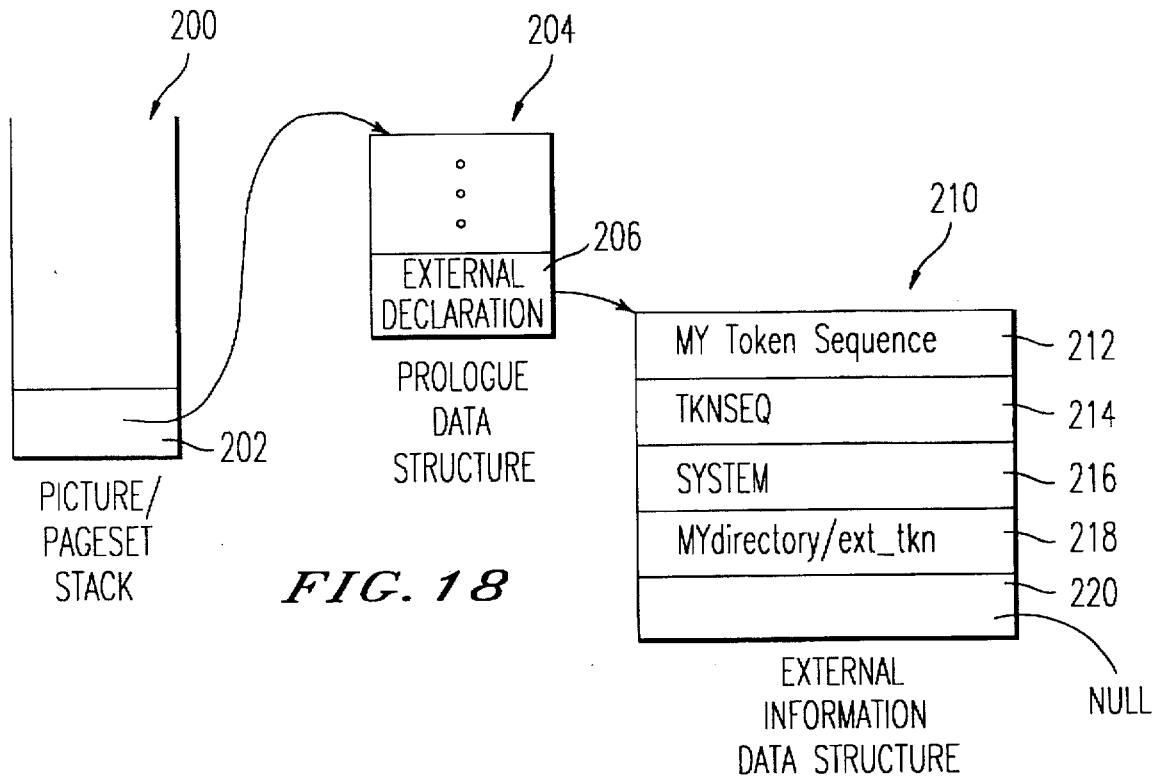
FIG. 18 illustrates the picture/pageset stack, prologue data structure, and external information data structure after processing line 12 of FIG. 4A.

FIG. 18 illustrates the picture/pageset stack 202, the prologue data structure 204, and the external information data structure 210 after processing line 12 of FIG. 4A. In FIG. 18, the external information data structure 210 has the structure ID as MyTokenSequence. The structure class type 214 indicates a token sequence and the location type 216 indicates system. The location information 218 indicates the location of the external inclusion which is mydirectory/ext_tkn. The pointer to the next external information data structure 220 points to null. Location Type and Location are obtained by looking up the location entity linked list at the given Input Level shown in FIG. 17 according to the flowchart illustrated in FIG. 11.

FIG. 19A illustrates the input stack at the start of processing line 1 of FIG. 4A. In FIG. 19A, the input level 312 is 0, the input location 314 is the input channel, indicating the source of the SPDL document illustrated in FIG. 16A, and the remaining entries of the input list data structure are null.

Figure 19B:
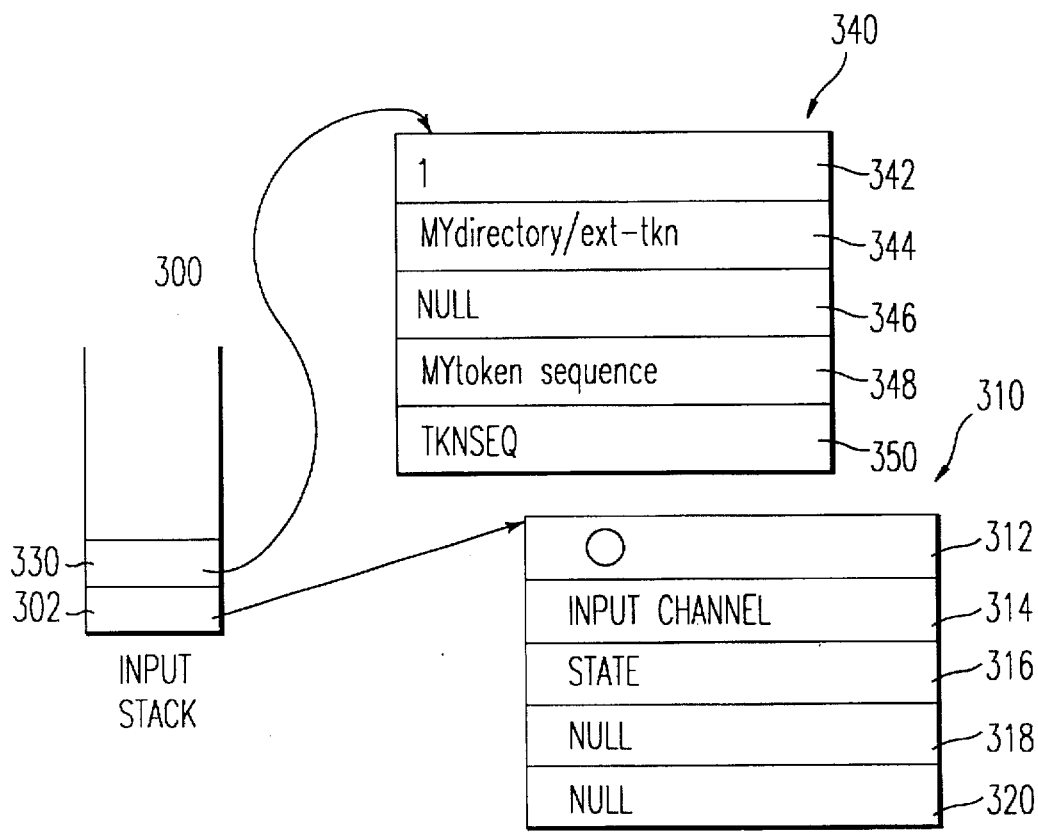
FIG. 19B shows the input stack and input list data structures after processing line 16 of FIG. 4A.

FIG. 19B illustrates the input stack and input list data structure after processing line 16 of FIG. 4A. The entries within the data structures are as illustrated.

Figure 20A:
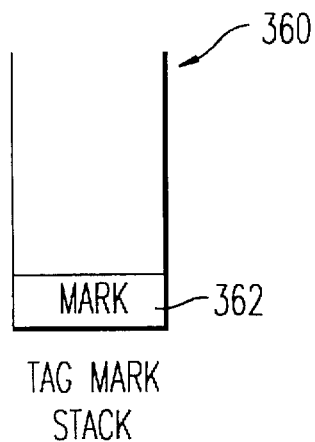
FIG. 20A illustrates the tag mark stack after processing line 3 of the external inclusion illustrated in FIG. 4B.
Figure 20B:
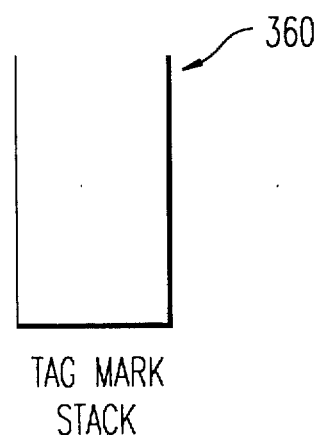
FIG. 20B illustrates the tag mark stack after processing line 7 of the external inclusion illustrated in FIG. 4B.

FIGS. 20A and 20B illustrate the tag mark stack during processing of the examples in FIG. 4A and 4B. FIG. 20A illustrates the tag mark stack after processing line 3 of the external inclusion illustrated in FIG. 4B. After processing the <TKNSEQN>, the entry MARK 362 is pushed onto the tag mark stack 360. After processing the end token sequence element </TNSEQN> at line 7 of FIG. 4B, the MARK entry 362 in the stack 360 is popped off and the stack is as illustrated in FIG. 20B.

Obviously, numerous modifications and variations of the present invention are possible in light of the above teachings. It is therefore to be understood that within the scope of the appended claims, the invention may be practiced otherwise than as specifically described herein. For example, a stack can be equivalently implemented as a linked list and a linked list can be equivalently implemented as a stack.

What is claimed as new and desired to be secured by Letters Patent of the United States is:

1. A method of processing a hierarchically structured page description language document, comprising the steps of:
   processing an element of the document indicating a location of a file which is to be later processed;
   creating a linked list data structure containing the location of said file;
   processing said file by determining information corresponding to said file including the location of said file by looking up information pertaining to said file in the linked list data structure;

examining a type of the file; and indicating an error when the type of the file is not a predetermined type, said method further comprising the steps of:

examining a format of said file and determining whether said file begins with a DOCTYPE element; and processing the DOCTYPE element, only when the step of examining determines that the file begins with a DOCTYPE element, wherein the step of processing the DOCTYPE element comprises:

examining if a next element after the DOCTYPE element is an SPDL token; and skipping the SPDL token, when the step of examining if a next element after the DOCTYPE element is an SPDL token determines that the next element after the DOCTYPE element is the SPDL token.

2. A method according to claim 1, further comprising the steps of:

processing an element of the document indicating a location of a second file which is to be later processed;

inserting a data structure in said linked list data structure containing the location of the second file; and processing said second file by determining information corresponding to said second file including the location of said second file by looking up information pertaining to said second file in the linked list data structure.

3. A method of processing an external inclusion of a hierarchically structured page description language document, comprising the steps of:

examining a file type of the external inclusion;

indicating an error when the type of the file is not a predetermined type;

pushing an entry onto a stack, the entry indicating a beginning of an element of the external inclusion, when said element of the external inclusion is a start tag corresponding to a predefined class type of the external inclusion;

pushing an entry onto the stack, each time a start tag which is within the external inclusion is processed, after the entry is pushed onto the stack which corresponds to the start tag of the predefined class type of the external inclusion;

popping off the top entry of the stack, each time an end tag of the external inclusion is processed;

terminating processing of the external inclusion after the top entry of the stack is popped off and a remaining entry in the stack corresponds to the start tag of the predefined class type of the external inclusion, said method further comprising the steps of:

examining a format of said file and determining whether said file begins with a DOCTYPE element; and processing the DOCTYPE element, only when the step of examining determines that the file begins with a DOCTYPE element, wherein the step of processing the DOCTYPE element comprises:

examining if a next element after the DOCTYPE element is an SPDL token; and skipping the SPDL token, when the step of examining if a next element after the DOCTYPE element is an SPDL token determines that the next element after the DOCTYPE element is the SPDL token.

4. A method according to claims 1 or 3, further comprising, performed before the step of skipping the SPDL token, the step of:

skipping two tokens after the DOCTYPE element.

5. A method of processing a hierarchically structured page description language document having an external inclusion, comprising the steps of:

processing an element of the document indicating a location of a file which is to be later processed;

creating a linked list data structure containing the location of said file;

creating a primary data structure which is a stack, wherein each hierarchical level of the document has a corresponding level in the stack;

examining a file type of the external inclusion;

indicating an error when the type of the file is not a predetermined type;

inputting an element indicating a beginning of a hierarchical level A of the document;

creating a plurality of references for a level A in said primary data structure, said plurality of references for the level A being used to keep track of parameters of the hierarchical level A of said document;

inputting an element at the hierarchical level A indicating predetermined information is to be used during processing of the document;

changing one of the references used for keeping track of parameters to refer to a data structure containing said predetermined information;

inputting an element indicating a beginning of a hierarchical level B of the document which is below the hierarchical level A in the hierarchical structure of the document; and creating a plurality of references for a level B in said primary data structure which is different from the level A in said primary data structure, said plurality of references for the level B being used to keep track of parameters of the hierarchical level B of said document, said plurality of references for the level B being equal to said plurality of references for the level A when said plurality of references for the level B are created;

wherein the level A in said primary data structure which is a stack is pushed into the stack before the level B is pushed into the stack; and wherein said plurality of references for the level A comprises a reference in said stack to a plurality of subsequent references, and said reference in said plurality of references for the level A which is used for keeping track of parameters includes a reference from said stack to said plurality of subsequent references and one of said plurality of subsequent references refers to said predefined information;

said method further comprising the step of:

processing said file by determining information corresponding to said file including the location of said file by looking up information pertaining to said file in the linked list data structure.

6. A method according to claim 5, further comprising the steps of:

processing an element of the document indicating a location of a second file which is to be later processed;

inserting a data structure in said linked list data structure containing the location of the second file; and processing said second file by determining information corresponding to said second file including the location of said second file by looking up information pertaining to said second file in the linked list data structure.

7. A method according to claim 5, further comprising the steps of:
   examining a format of said file and determining whether said file begins with a DOCTYPE element; and
   processing the DOCTYPE element, only when the step of examining determines that the file begins with a DOCTYPE element.

8. A method according to claim 7, wherein the step of processing the DOCTYPE element comprises:
   examining if a next element after the DOCTYPE element is an SPDL token; and
   skipping the SPDL token, when the step of examining if a next element after the DOCTYPE element is an SPDL token determines that the next element after the DOCTYPE element is the SPDL token.

9. A method according to claim 8, further comprising, performed before the step of skipping the SPDL token, the step of:
   skipping two tokens after the DOCTYPE element.

10. A method of processing a hierarchically structured page description language document having an external inclusion, comprising the steps of:
    creating a primary data structure which is a stack, wherein each hierarchical level of the document has a corresponding level in the stack;
    inputting an element indicating a beginning of a hierarchical level A of the document;
    creating a plurality of references for a level A in said primary data structure, said plurality of references for the level A being used to keep track of parameters of the hierarchical level A of said document;
    inputting an element at the hierarchical level A indicating predetermined information is to be used during processing of the document;
    changing one of the references used for keeping track of parameters to refer to a data structure containing said predetermined information;
    inputting an element indicating a beginning of a hierarchical level B of the document which is below the hierarchical level A in the hierarchical structure of the document; and
    creating a plurality of references for a level B in said primary data structure which is different from the level A in said primary data structure, said plurality of references for the level B being used to keep track of parameters of the hierarchical level B of said document, said plurality of references for the level B being equal to said plurality of references for the level A when said plurality of references for the level B are created;
    wherein the level A in said primary data structure which is a stack is pushed into the stack before the level B is pushed into the stack; and
    wherein said plurality of references for the level A comprises a reference in said stack to a plurality of subsequent references, and said reference in said plurality of references for the level A which is used for keeping track of parameters includes a reference from said stack to said plurality of subsequent references and one of said plurality of subsequent references refers to said predefined information;
    said method further comprising the steps of:
       pushing an entry onto a second stack, the entry indicating a beginning of an element of the external inclusion, when said element of the external inclusion is a start tag corresponding to a predefined class type of the external inclusion;
       examining a file type of the external inclusion;
       indicating an error when the type of the file is not a predetermined type;
       pushing an entry onto the second stack, each time a start tag which is within the external inclusion is processed, after the entry is pushed onto the second stack which corresponds to the start tag of the predefined class type of the external inclusion;
       popping off the top entry of the second stack, each time an end tag of the external inclusion is processed; and
       terminating processing of the external inclusion after the top entry of the second stack is popped off and a remaining entry in the second stack corresponds to the start tag of the predefined class type of the external inclusion.

11. A system for processing a hierarchically structured page description language document, comprising:
    means for processing an element of the document indicating a location of a file which is to be later processed;
    means for creating a linked list data structure containing the location of said file;
    means for processing said file by determining information corresponding to said file including the location of said file by looking up information pertaining to said file in the linked list data structure;
    means for examining a type of the file; and
    means for indicating an error when the type of the file is not a predetermined type,
    said system further comprising:
       means for examining a format of said file and determining whether said file begins with a DOCTYPE element: and
       means for processing the DOCTYPE element, only when the means for examining determines that the file begins with a DOCTYPE element,
    wherein the means for processing the DOCTYPE element comprises:
       means for examining if a next element after the DOCTYPE element is an SPDL token: and
       means for skipping the SPDL token when the means for examining if a next element after the DOCTYPE element is an SPDL token determines that the next element after the DOCTYPE element is the SPDL token.

12. A system according to claim 11, further comprising:
    means for processing an element of the document indicating a location of a second file which is to be later processed;
    means for inserting a data structure in said linked list data structure containing the location of the second file; and
    means for processing said second file by determining information corresponding to said second file including the location of said second file by looking up information pertaining to said second file in the linked list data structure.

13. A system for processing an external inclusion of a hierarchically structured page description language document, comprising:
    means for examining a file type of the external inclusion;
    means for indicating an error when the type of the file is not a predetermined type;
    means for pushing an entry onto a stack, the entry indicating a beginning of an element of the external inclusion, when said element of the external inclusion is a start tag corresponding to a predefined class type of the external inclusion;

means for pushing an entry onto the stack, each time a start tag which is within the external inclusion is processed, after the entry is pushed onto the stack which corresponds to the start tag of the predefined class type of the external inclusion;

means for popping off the top entry of the stack, each time an end tag of the external inclusion is processed;

means for terminating processing of the external inclusion after the top entry of the stack is popped off and a remaining entry in the stack corresponds to the start tag of the predefined class type of the external inclusion, said system further comprising:

means for examining a format of said file and determining whether said file begins with a DOCTYPE element; and means for processing the DOCTYPE element only when the means for examining determines that the file begins with a DOCTYPE element, wherein the means for processing the DOCTYPE element comprises:

means for examining if a next element after the DOCTYPE element is an SPDL token; and means for skipping the SPDL token when the means for examining if a next element after the DOCTYPE element is an SPDL token determines that the next element after the DOCTYPE element is the SPDL token.

14. A system according to claims 11 or 13, further comprising:

means for skipping two tokens after the DOCTYPE element.

15. A system for processing a hierarchically structured page description language document having an external inclusion, comprising:

means for processing an element of the document indicating a location of a file which is to be later processed;

means for creating a linked list data structure containing the location of said file;

means for creating a primary data structure which is a stack, wherein each hierarchical level of the document has a corresponding level in the stack;

means for inputting an element indicating a beginning of a hierarchical level A of the document;

means for creating a plurality of references for a level A in said primary data structure, said plurality of references for the level A being used to keep track of parameters of the hierarchical level A of said document;

means for inputting an element at the hierarchical level A indicating predetermined information is to be used during processing of the document;

means for changing one of the references used for keeping track of parameters to refer to a data structure containing said predetermined information;

means for inputting an element indicating a beginning of a hierarchical level B of the document which is below the hierarchical level A in the hierarchical structure of the document; and means for creating a plurality of references for a level B in said primary data structure which is different from the level A in said primary data structure, said plurality of references for the level B being used to keep track of parameters of the hierarchical level B of said document, said plurality of references for the level B being equal to said plurality of references for the level A when said plurality of references for the level B are created;

wherein the level A in said primary data structure which is a stack is pushed into the stack before the level B is pushed into the stack; and wherein said plurality of references for the level A comprises a reference in said stack to a plurality of subsequent references, and said reference in said plurality of references for the level A which is used for keeping track of parameters includes a reference from said stack to said plurality of subsequent references and one of said plurality of subsequent references refers to said predefined information;

said system further comprising:

means for examining a file type of the external inclusion;

means for indicating an error when the type of the file is not a predetermined type;

means for processing said file by determining information corresponding to said file including the location of said file by looking up information pertaining to said file in the linked list data structure.

16. A system according to claim 15, further comprising:

means for processing an element of the document indicating a location of a second file which is to be later processed;

means for inserting a data structure in said linked list data structure containing the location of the second file; and means for processing said second file by determining information corresponding to said second file including the location of said second file by looking up information pertaining to said second file in the linked list data structure.

17. A system for processing a hierarchically structured page description language document having an external inclusion, comprising:

means for creating a primary data structure which is a stack, wherein each hierarchical level of the document has a corresponding level in the stack;

means for inputting an element indicating a beginning of a hierarchical level A of the document;

means for creating a plurality of references for a level A in said primary data structure, said plurality of references for the level A being used to keep track of parameters of the hierarchical level A of said document;

means for examining a file type of the external inclusion;

means for indicating an error when the type of the file is not a predetermined type:

means for inputting an element at the hierarchical level A indicating predetermined information is to be used during processing of the document;

means for changing one of the references used for keeping track of parameters to refer to a data structure containing said predetermined information;

means for inputting an element indicating a beginning of a hierarchical level B of the document which is below the hierarchical level A in the hierarchical structure of the document; and means for creating a plurality of references for a level B in said primary data structure which is different from the level A in said primary data structure, said plurality of references for the level B being used to keep track of parameters of the hierarchical level B of said document, said plurality of references for the level B being equal to said plurality of references for the level A when said plurality of references for the level B are created;

wherein the level A in said primary data structure which is a stack is pushed into the stack before the level B is pushed into the stack; and wherein said plurality of references for the level A comprises a reference in said stack to a plurality of subsequent references, and said reference in said plurality of references for the level A which is used for keeping track of parameters includes a reference from said stack to said plurality of subsequent references and one of said plurality of subsequent references refers to said predefined information;

said system further comprising:

means for pushing an entry onto a second stack, the entry indicating a beginning of an element of the external inclusion, when said element of the external inclusion is a start tag corresponding to a predefined class type of the external inclusion;

means for pushing an entry onto the second stack, each time a start tag which is within the external inclusion is processed, after the entry is pushed onto the second stack which corresponds to the start tag of the predefined class type of the external inclusion;

means for popping off the top entry of the second stack, each time an end tag of the external inclusion is processed;

and means for terminating processing of the external inclusion after the top entry of the second stack is popped off and a remaining entry in the second stack corresponds to the start tag of the predefined class type of the external inclusion.

18. A system according to claim 17, further comprising:

means for examining a format of said file and determining whether said file begins with a DOCTYPE element; and means for processing the DOCTYPE element, only when the means for examining determines that the file begins with a DOCTYPE element.

19. A system according to claim 18, wherein the means for processing the DOCTYPE element comprises:

means for examining if a next element after the DOCTYPE element is an SPDL token; and means for skipping the SPDL token, when the means for examining if a next element after the DOCTYPE element is an SPDL token determines that the next element after the DOCTYPE element is the SPDL token.

20. A system according to claim 19, further comprising:

means for skipping two tokens after the DOCTYPE element.

\* \* \* \* \*